(12) United States Patent
Sabolis et al.

(10) Patent No.: US 10,962,510 B2
(45) Date of Patent: Mar. 30, 2021

(54) GAS CHROMATOGRAPH DEVICE WITH COLUMN RECOGNITION TECHNOLOGY SYSTEM AND METHOD OF USE THEREOF

(71) Applicant: CEM Corporation, Lucidity Division, Matthews, NC (US)

(72) Inventors: Alyssa Whitney Sabolis, Weddington, NC (US); Michael John Collins, Jr., Huntersville, NC (US); Michael Craig Davis, Tega Cay, SC (US); Daniel Charles Scheid, Indian Trail, NC (US); Brian Thomas Unites, Shelby, NC (US); Richard Michael Chapman, Fort Mill, SC (US)

(73) Assignee: CEM Corporation, Lucidity Division, Matthews, NC (US)

( * ) Notice: Subject to any disclaimer, the term of this patent is extended or adjusted under 35 U.S.C. 154(b) by 137 days.

(21) Appl. No.: 16/047,577

(22) Filed: Jul. 27, 2018

(65) Prior Publication Data

US 2019/0033271 A1 Jan. 31, 2019

Related U.S. Application Data

(60) Provisional application No. 62/537,803, filed on Jul. 27, 2017.

(51) Int. Cl.
*B01D 53/02* (2006.01)
*G01N 30/60* (2006.01)
(Continued)

(52) U.S. Cl.
CPC ......... *G01N 30/6047* (2013.01); *G01N 30/18* (2013.01); *G01N 30/30* (2013.01); *G01N 30/606* (2013.01); *G01N 30/8696* (2013.01); *G01N 30/88* (2013.01); *G01N 30/6026* (2013.01); *G01N 30/6091* (2013.01); *G01N 2030/025* (2013.01); *G01N 2030/185* (2013.01);
(Continued)

(58) Field of Classification Search
CPC ....... G01N 2030/025; G01N 2030/185; G01N 2030/3084; G01N 2030/8804; G01N 30/18; G01N 30/30; G01N 30/6026; G01N 30/6047; G01N 30/606; G01N 30/6091; G01N 30/8696; G01N 30/88
See application file for complete search history.

(56) References Cited

U.S. PATENT DOCUMENTS 3,023,835 A 3/1962 Brashear
5,437,179 A 8/1995 Wiegand et al.
(Continued)

OTHER PUBLICATIONS

International Search Report and Written Opinion dated Oct. 12, 2018 for PCT/US2018/044191.

*Primary Examiner* — Christopher P Jones
(74) *Attorney, Agent, or Firm* — Jeffrey C. Watson; Mathew L. Grell; Grell & Watson Patent Attorneys LLC

(57) ABSTRACT

A gas chromatograph with column recognition technology system for the column includes a column and the column recognition technology system for the column. The column is configured for gas chromatography. The column includes column parameters associated with the column. The column recognition technology system may be configured to auto-recognize the column in the gas chromatograph device. Wherein, the column recognition technology system may be configured to auto-recognize the column parameters associated with the auto-recognized column.

18 Claims, 15 Drawing Sheets

(51) Int. Cl.
*G01N 30/18* (2006.01)
*G01N 30/30* (2006.01)
*G01N 30/86* (2006.01)
*G01N 30/88* (2006.01)
*G01N 30/02* (2006.01)

(52) U.S. Cl.
CPC ............... *G01N 2030/3084* (2013.01); *G01N 2030/8804* (2013.01)

(56) References Cited

U.S. PATENT DOCUMENTS

| | | |
|---|---|---|
| 5,589,630 A | 12/1996 | Wiegand et al. |
| 5,939,614 A | 8/1999 | Walters et al. |
| 5,954,860 A | 9/1999 | Gordon |
| 6,029,498 A | 2/2000 | Walters et al. |
| 6,354,136 B1 | 3/2002 | Bremer et al. |
| 6,427,522 B1 | 8/2002 | Thomas et al. |
| 6,475,443 B1 | 11/2002 | van Deursen et al. |
| 7,291,203 B2 | 11/2007 | Crnko et al. |
| 9,678,046 B2 | 6/2017 | Tolley et al. |
| 2009/0038369 A1 | 2/2009 | Vondras |
| 2012/0285325 A1 | 11/2012 | Tipler et al. |
| 2012/0309100 A1 | 12/2012 | Hsiao et al. |
| 2013/0025347 A1 | 1/2013 | Rhodes et al. |
| 2013/0218352 A1 | 8/2013 | Iovanni et al. |
| 2016/0069845 A1 | 3/2016 | Fogwill et al. |

GAS CHROMATOGRAPH DEVICE WITH COLUMN RECOGNITION TECHNOLOGY SYSTEM AND METHOD OF USE THEREOF

CROSS-REFERENCE TO RELATED APPLICATIONS

This application claims benefit of priority application, U.S. Provisional Ser. No. 62/537,803 filed on Jul. 27, 2017 entitled "Gas Chromatograph (GC) With At Least A Removable Column Holder, Positioning System for The Inlet Liner And The Column, Column Recognition Technology System, Inductively Heated Column and/or Miniaturized Dimensions", which is incorporated herein by reference in its entirety.

FIELD OF THE DISCLOSURE

The present disclosure is directed to gas chromatographs, also known as GCs. More specifically, the instant disclosure is directed to a gas chromatograph or GC with column recognition technology system and a method of use thereof.

BACKGROUND

Gas chromatography (GC) is a common type of chromatography used in analytical chemistry for separating and analyzing compounds that can be vaporized without decomposition. Gas chromatography is also sometimes known as vapor-phase chromatography (VPC), or gas-liquid partition chromatography (GLPC). Typical uses of GC may include testing the purity of a particular substance, or separating the different components of a mixture, and determining the relative amounts of different components of a mixture. As a result, in some situations, GC may be useful in identifying a compound. As another example, in preparative chromatography, GC can be used to prepare pure compounds from a mixture.

In gas chromatography, the mobile phase (or "moving phase") is a carrier gas, usually an inert gas such as helium or an unreactive gas such as nitrogen. Helium remains the most commonly used carrier gas in most common instruments, however, hydrogen is preferred for improved separations. The stationary phase is a microscopic layer of liquid or polymer on an inert solid support, inside a piece of tubing (typically glass or metal) called a column. The instrument used to perform gas chromatography is called a gas chromatograph (also known as an "aerograph" or "gas separator").

The gaseous compounds being analyzed interact with the walls of the column, which is coated with a stationary phase. This causes each compound to elute at a different time, known as the retention time of the compound. The comparison of retention times is what gives GC its analytical usefulness.

Gas chromatography is, in principle, like column chromatography (as well as other forms of chromatography, such as HPLC, TLC), but has several notable differences. First, the process of separating the compounds in a mixture is carried out between a liquid stationary phase and a gas mobile phase. On the other hand, in column chromatography the stationary phase is a solid and the mobile phase is a liquid. Therefore, the full name of the procedure is "gas-liquid chromatography", referring to the mobile and stationary phases, respectively. Second, the column, through which the gas phase passes, is located in an oven where the temperature of the gas can be controlled. On the other hand, standard column chromatography typically has no such temperature control. Finally, the concentration of a compound in the gas phase is solely a function of the vapor pressure of the gas. Gas chromatography is also like fractional distillation, since both processes separate the components of a mixture primarily based on boiling point (or vapor pressure) differences. However, fractional distillation is typically used to separate components of a mixture on a large scale, whereas GC can be used on a much smaller scale (i.e. microscale).

One problem that has been discovered with known gas chromatographs is their size, cost, and ease of use, as known gas chromatographs are typically laboratory grade. Currently, laboratory grade gas chromatographs are large expensive machines that require extensive training for operation. This leads to gas chromatographs being found mainly in academia or industrial labs. For example, in research universities, where each university may only have one gas chromatograph located in a designated area or even room, which is shared among many departments, thereby requiring users to schedule time with the gas chromatograph and its operator(s). This problem may be similar in most industrial labs as well. As such, to provide better access to GC, there is clearly a need to provide a gas chromatograph that is smaller, costs less, and is easier to use.

As an example of the difficulty with use, in typical gas chromatographs, prior to the instant disclosure, gas chromatographs themselves had no idea what column was in the system. The GC would run blindly on the parameters the users have input to the system such as linear velocity, inlet gas pressure, flow rate, temperature settings and ramps. As such, it was up to the user to understand to read this information on the column he or she is using and use this information to calculate input values for these different needed operating parameters. In many cases the user had to rely upon online resources or look up table to make some of these calculations themselves. This meant that operation typically required a trained professional and there was a lot of risk of getting bad data or damaging the column based on incorrect entry of these parameters. As such, there is clearly a need to provide a way for gas chromatographs to identify, recognize, and/or track the column being used by the GC.

The instant disclosure is designed to address at least certain aspects of the problems or needs discussed above by providing a gas chromatograph with column recognition technology system and a method of use thereof.

SUMMARY

Accordingly, in one aspect, the present disclosure embraces a gas chromatograph device that includes a column recognition technology system. The column may be configured for gas chromatography. The column may include column parameters associated with the column. The column recognition technology system may be configured to auto-recognize the column in the gas chromatograph device. Wherein, the column recognition technology system may be configured to auto-recognizes the column parameters associated with the auto-recognized column.

One feature of the instant gas chromatograph device that includes a column recognition technology system may be that the column recognition technology system may be configured for allowing programming of the gas chromatograph device by automatically inputting the column parameters associated with the auto-recognized column into software of the gas chromatograph device so that the user has much less to program when running the gas chromatograph device.

Another feature of the instant gas chromatograph device that includes a column recognition technology system may be that the column recognition technology system may be configured to improve performance of the gas chromatograph device by suggesting other operating parameters based on the auto recognized column.

Another feature of the instant gas chromatograph device that includes a column recognition technology system may be that the column recognition technology system may be configured to increase the lifetime of the auto-recognized column.

Another feature of the instant gas chromatograph device that includes a column recognition technology system may be that the column recognition technology system may be configured to decrease issues with the gas chromatograph device by warning the user against operating parameters that are not compatible with certain column types.

Another feature of the instant gas chromatograph device that includes a column recognition technology system may be that the column recognition technology system may be configured to warn the user against using high column temperatures for temperature sensitive columns.

Another feature of the instant gas chromatograph device that includes a column recognition technology system may be that the column recognition technology system may be configured to write a number of runs associated with the auto-recognized column, wherein, the column recognition technology system may be configured to enable users to see how close the auto-recognized column is to the end of its lifetime based on the number of runs written to the auto-recognized column.

In select embodiments, the instant gas chromatograph device that includes a column recognition technology system may include a two-way communication between the gas chromatograph device and the auto-recognized column. Wherein the two-way communication between the gas chromatograph device and the auto-recognized column may be configured for reading stored information from the column as well as writing new information to the column.

In select embodiments of the instant gas chromatograph device that includes a column recognition technology system, the column recognition technology system may include a wireless communication between the gas chromatograph device and a removable column holder. The removable column holder may house the column. The removable column holder may be configured to be removable from the gas chromatograph device with the column.

In select embodiments of the instant gas chromatograph device that includes a column recognition technology system, the wireless communication of the column recognition technology system may include a radio-frequency identification ("RFID") tag positioned on the column or removable column holder. In addition, the column recognition technology system may include an RFID reader/writer positioned inside or on the gas chromatograph device. Wherein the RFID tag may be configured to allow the column recognition technology system to pull or read the column parameters associated with the column from the auto-recognized column. In select embodiments, the column parameters pulled or read from the RFID tag by the column recognition technology system may include, but are not limited to, a column inner diameter, a film thickness, a column length, a number of runs, maximum allowable operating parameters, the like, and combinations thereof. In addition, the stored information pulled or read from the RFID tag by the column recognition technology system may be configured to calculate variables of the gas chromatograph device. In select embodiments, these variables calculated for the gas chromatograph device may include, but are not limited to, linear velocity, inlet carrier gas pressure, the like, and combinations thereof. In other select embodiments, the stored information pulled or read from the RFID tag by the column recognition technology system may be configured to limit other input parameters. As an example, and clearly not limited thereto, these other input parameters limited by the stored information pulled or read from the RFID tag may include, but are not limited to, maximum temperatures, the like, etc. These parameters may be configured to ensure the best performance and limit damage to the column.

In select embodiments, the instant gas chromatograph device that includes a column recognition technology system may further include a frame, a cover, gas fittings in fluid communication with an injector port, a detector, and at least one vent hole in the cover configured for providing air flow through the column via at least one fan.

In another aspect, the instant disclosure embraces a column recognition technology system for the gas chromatograph device. The column recognition technology system may be any of the various embodiments of the column recognition technology system shown and/or described herein. In general, in select embodiments, the column recognition technology system for the gas chromatograph device may include the gas chromatograph device with the column configured for gas chromatography. The column may include column parameters associated with the column. The column recognition technology system may be configured to auto-recognize the column in the gas chromatograph device. A two-way communication may be included between the gas chromatograph device and the auto-recognized column. Wherein, the column recognition technology system may be configured to auto-recognize the column parameters associated with the auto-recognized column.

In select embodiments of the instant column recognition technology system for the gas chromatograph device, the two-way communication between the gas chromatograph device and the auto-recognized column may be configured for reading stored information from the column as well as writing new information to the column.

In other select embodiments, the column recognition technology system for the gas chromatograph device may include a wireless communication between the gas chromatograph device and the removable column holder. The removable column holder may house the column and may be configured to be removable from the gas chromatograph device with the column.

In other select embodiments of the column recognition technology system for the gas chromatograph device, the wireless communication may include an RFID tag positioned on the column or the removable column holder. In addition, an RFID reader/writer may be positioned inside or on the gas chromatograph device. Wherein, the RFID tag may be configured to allow the column recognition technology system to pull or read the column parameters associated with the column from the auto-recognized column. In select embodiments, the column parameters pulled or read from the RFID tag by the column recognition technology system may include, but are not limited to, a column inner diameter, a film thickness, a column length, a number of runs, maximum allowable operating parameters, the like, and combinations thereof. Wherein, the stored information pulled from the RFID tag by the column recognition technology system may be configured to calculate variables of the gas chromatograph device. In select embodiments, these variables calculated for the gas chromatograph device may include, but are not limited to, linear velocity, inlet carrier gas pressure, the like, and combinations thereof. In other select embodiments, the stored information pulled from the RFID tag by the column recognition technology system may be configured to limit other input parameters. As an example, in select embodiments, these input parameters limited by the column recognition technology system may include, but are not limited to, maximum temperatures, the like, etc. These input parameters limited by the column recognition technology system may be configured to ensure the best performance and limit damage to the column.

One feature of the instant column recognition technology system may be that it can be configured for allowing programming of the gas chromatograph device by automatically inputting the column parameters associated with the auto-recognized column into software of the gas chromatograph device so that the user has much less to program when running the gas chromatograph device.

Another feature of the instant column recognition technology system may be that it can be configured to improve performance of the gas chromatograph device by suggesting other operating parameters based on the auto recognized column.

Another feature of the instant column recognition technology system may be that it can be configured to increase the lifetime of the auto-recognized column.

Another feature of the instant column recognition technology system may be that it can be configured to decrease issues with the gas chromatograph device by warning the user against operating parameters that are not compatible with certain column types.

Another feature of the instant column recognition technology system may that it can be configured to warn the user against using high column temperatures for temperature sensitive columns.

Another feature of the instant column recognition technology system may be that it can be configured to write a number of runs associated with the auto-recognized column, wherein, the column recognition technology system may be configured to enable users to see how close the auto-recognized column is to the end of its lifetime based on the number of runs written to the auto-recognized column.

In another aspect, the instant disclosure embraces a method of recognizing a column inserted or installed in a gas chromatograph device. The instant method of recognizing the column inserted or installed in the gas chromatograph device may generally include the step of providing the column recognition technology system for the gas chromatograph device in any of the various embodiments shown and/or described herein. In general, the provided column recognition technology system may include the gas chromatograph device with the column configured for gas chromatography. The column may include column parameters associated with the column. The column recognition technology system may be configured to auto-recognize the column in the gas chromatograph device. A two-way communication may be included between the gas chromatograph device and the auto-recognized column. Wherein, the method of recognizing the column inserted or installed in the gas chromatograph device may further include: auto-recognizing the column, and auto-recognizing the column parameters associated with the auto-recognized column.

In select embodiments of the instant method of recognizing the column inserted or installed in the gas chromatograph device, the method may further include: reading the column parameters from the auto-recognized column including, but not limited to, column inner diameter, film thickness, column length, number of runs, and maximum allowable operating parameters, the like, and combinations thereof; writing new information to the column including number of runs; and calculating variables of the gas chromatograph device including, but not limited to, linear velocity, inlet carrier gas pressure, the like, and combinations thereof.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

Figure 1:
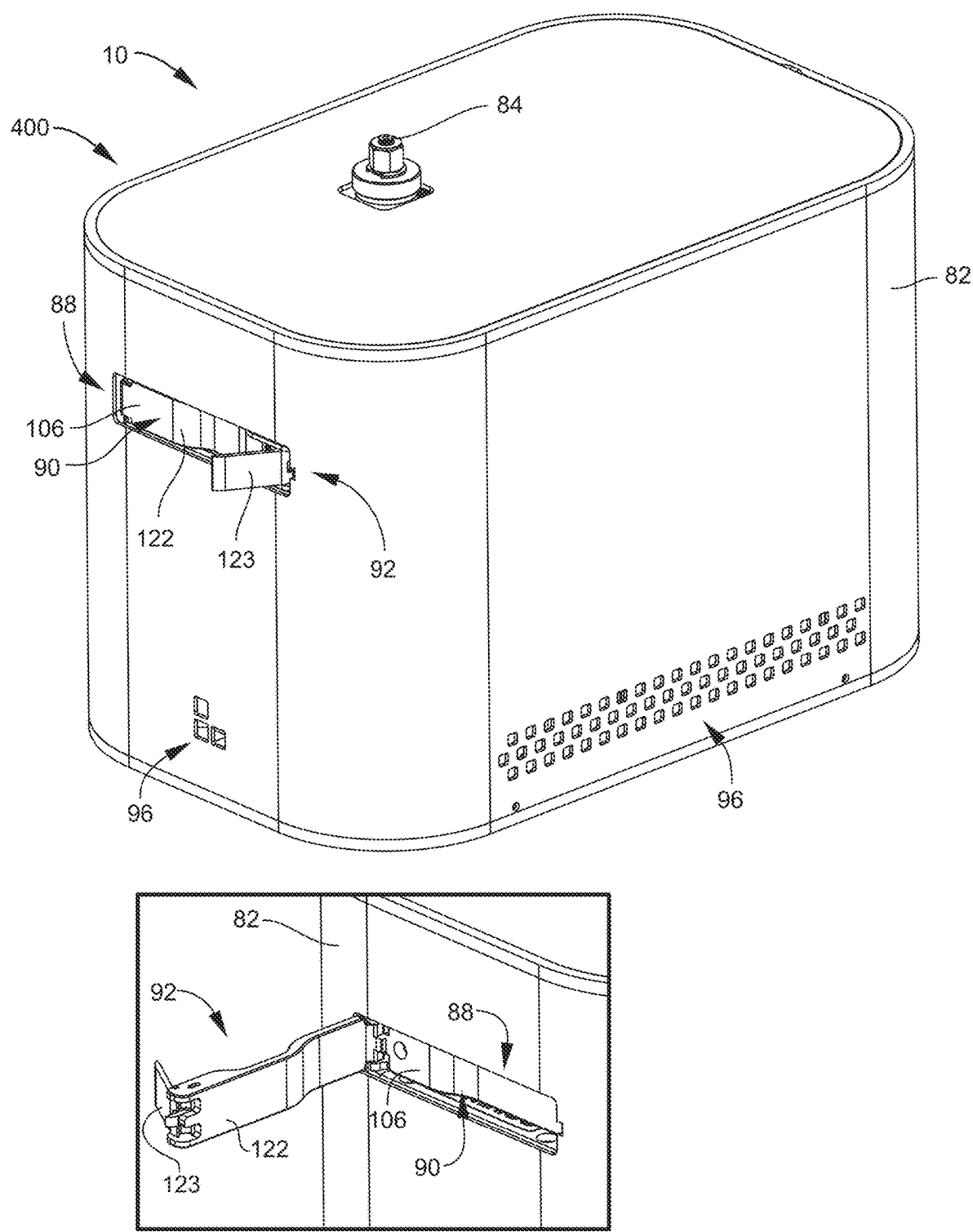
FIG. 1 is a perspective front top view of select embodiments of the gas chromatograph device according to the instant disclosure with the locking mechanism locked and unlocked below.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-18, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-17, in a possibly preferred embodiment, the present disclosure overcomes the above-mentioned disadvantages and meets the recognized need for such an apparatus or method by providing of gas chromatograph device 10 with column recognition technology system 400. Gas chromatograph device 10 may be referred to herein as gas chromatograph, miniature gas chromatograph, miniature GC, mini gas chromatograph, mini GC, or just GC. Gas chromatograph device 10 may be for gas chromatography (GC), or may be used in analytical chemistry for separating and analyzing compounds that can be vaporized without decomposition. As such, gas chromatograph device 10 may be used for, but is not limited to, testing the purity of a particular substance, or separating the different components of a mixture, and determining the relative amounts of different components of a mixture. As a result, in some situations, gas chromatograph device 10 may be useful in identifying a compound. As another example, in preparative chromatography, gas chromatograph device 10 can be used to prepare pure compounds from a mixture.

Gas chromatograph device 10 may be provided with unique features, including, but not limited to, at least column recognition technology system 400 for column 12, positioning system 200 for inlet liner 202 and column 12, removable column holder 90, inductive heating of column 12, and/or miniaturized dimensions (see FIGS. 1-16). However, although the instant disclosure may be directed to column recognition technology system 400 for column 12 aspect of gas chromatograph device 10, the disclosure is not so limited, and gas chromatograph device 10 may include these other unique features as well.

In general, the instant disclosure is directed to gas chromatograph device 10 that includes column recognition technology system 400. As such, gas chromatograph device 10 may generally include column 12 that is configured for gas chromatography, and column recognition technology system 400 for recognizing column 12. Column 12 may be configured for gas chromatography. Column 12 may include column parameters 412 associated with column 12. Column recognition technology system 400 may be configured to auto-recognize column 12 in gas chromatograph device 10. Wherein, column recognition technology system 400 may be configured to auto-recognize column parameters 412 associated with auto-recognized column 12. Column recognition technology system 400 may be configured for allowing programming of the gas chromatograph device 10 by automatically inputting column parameters 412 associated with the auto-recognized column 12 into software of gas chromatograph device 10. This feature may allow the user to have much less to program when running gas chromatograph device 10. Column recognition technology system may also be configured to improve performance of gas chromatograph device 10 by suggesting other operating parameters or variables 420 of gas chromatograph device 10 based on the auto recognized column 12. Column recognition technology system 400 may also be configured to increase the lifetime of the auto-recognized column 12. Column recognition technology system 400 may be configured to decrease issues with gas chromatograph device 10 by warning the user against operating parameters or variables 424 of gas chromatograph device 10 that are not compatible with certain column types. Column recognition technology system 400 may also be configured to warn the user against using high column temperatures for temperature sensitive columns 12, like by providing or calculating maximum temperature 430. Column recognition technology system 400 may also be configured to write number of runs 420 associated with the auto-recognized column 12. With this feature or configuration, column recognition technology system 400 may be configured to enable users to see how close the auto-recognized column 12 is to the end of its lifetime based on number of runs 420 written to the auto-recognized column 12.

Figure 17:
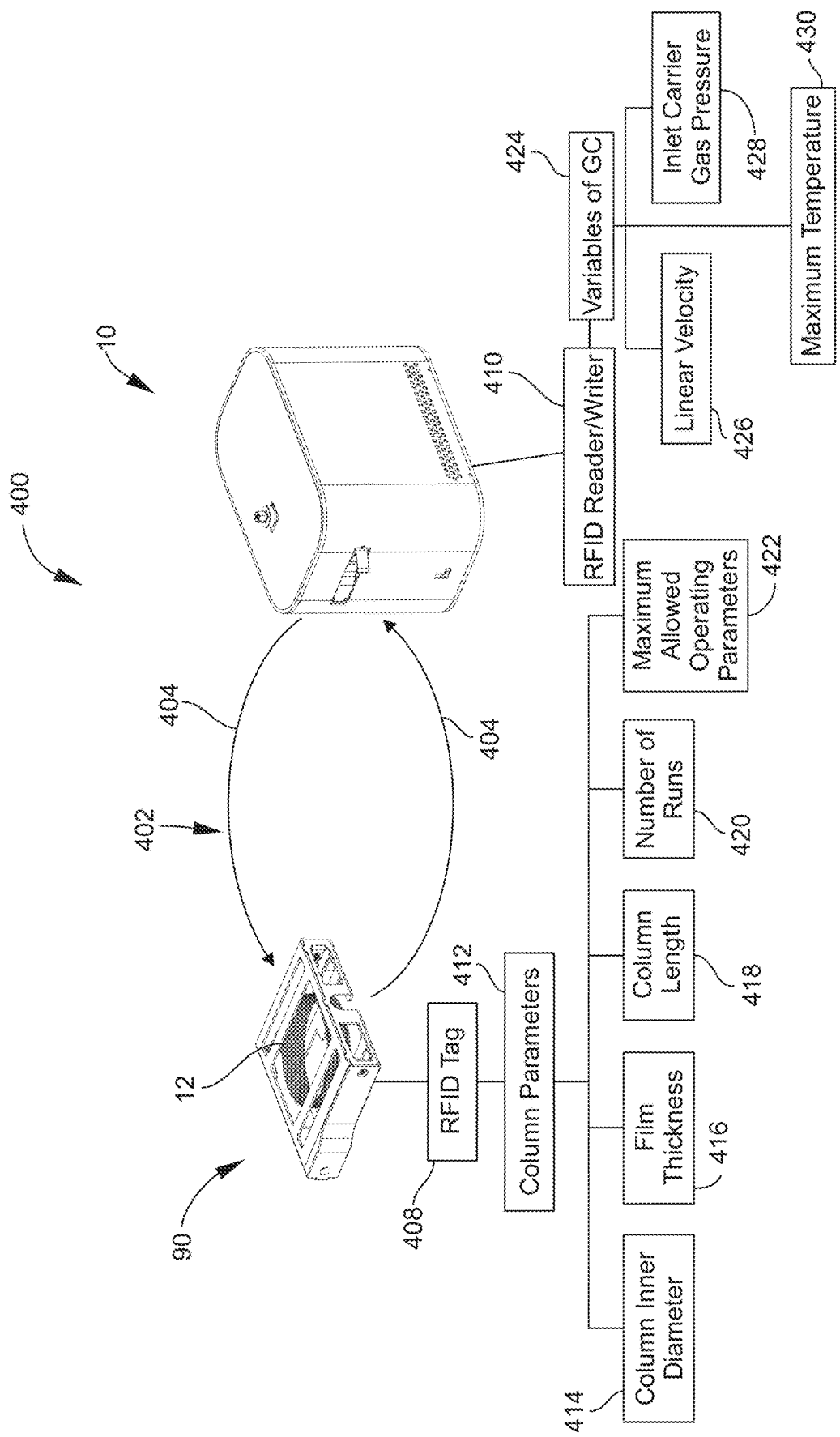
FIG. 17 is a system diagram of select embodiments of the column recognition technology system according to select embodiments of the instant disclosure.

Referring now specifically to FIG. 17, in select embodiments, column recognition technology system 400 may include two-way communication 402. Two-way communication 402 may be between gas chromatograph device 10 and auto-recognized column 12. Wherein, two-way communication 402 between gas chromatograph device 10 and auto-recognized column 12 may be configured for reading stored information from column 12 as well as writing new information to column 12. Two-way communication 402 between gas chromatograph device 10 and auto-recognized column 12 may be any form of communication. In select embodiments, two-way communication 402 of column recognition technology system 400 may include wireless communication 404. Wireless communication 404 may be between gas chromatograph device 10 and column 12 in removable column holder 90. Removable column holder 90 may house column 12. Removable column holder 90 may be configured to be removable from gas chromatograph device 10 with column 12. Wireless communication 404 may be any form of wireless communication between column 12 and gas chromatograph device 10. In select embodiments, wireless communication 404 of column recognition technology system 400 may include radio-frequency identification ("RFID") tag 408 positioned on column 12 or removable column holder 90. In addition, wireless communication 404 of column recognition technology system 400 may include RFID reader/writer 410 positioned inside or on gas chromatograph device 10. Wherein, RFID tag 408 may be configured to allow column recognition technology system 400 to pull or read column parameters 412 associated with column 12 from auto-recognized column 12. In select embodiments, column parameters 412 pulled or read from RFID tag 408 by column recognition technology system 400 may include, but are not limited to, column inner diameter 414, film thickness 416, column length 418, number of runs 420, maximum allowable operating parameters 422, the like, and combinations thereof. In addition, the stored information pulled or read from RFID tag 408 by column recognition technology system 400 may be configured to calculate variables 424 of gas chromatograph device 10. In select embodiments, these variables 424 calculated for gas chromatograph device 10 may include, but are not limited to, linear velocity 426, inlet carrier gas pressure 428, the like, and combinations thereof. In other select embodiments, the stored information pulled or read from RFID tag 408 by column recognition technology system 400 may be configured to limit other input parameters or variables 424 of gas chromatograph device 10. As an example, and clearly not limited thereto, these other input parameters limited by the stored information pulled or read from RFID tag 408 may include, but are not limited to, maximum temperatures 430, the like, etc. These parameters may be configured to ensure the best performance and limit damage to column 12. Although the instant disclosure is directed toward the use of RFID technology with RFID tag 408 and RFID reader/writer 410, the disclosure is not so limited, and any other wired or wireless technologies may be used for two-way communication 402 between gas chromatograph device 10 and column 12, including any known or future developed wired or wireless technologies, or the like.

Column 12 may be included in removable column holder 90. Column 12 may be any column configured for chromatography and configured for insertion inside removable column holder 90. Column 12 may include first tip 99 at one end and second tip 101 at its other end. Injector port pin 98 may be connected to first tip 99 and detector pin 100 may be connected to second tip 101.

Removable column holder 90 may be for housing or holding column 12. Removable column holder 90 may be configured to be removable from gas chromatograph device 10 with column 12. As such, when removable column holder 90 is removed from gas chromatograph device 10, column 12 is removed with removable column holder 90 from gas chromatograph device 10. Removable column holder 90 may house only column 12. In other words, removable column holder 90 may not include or house any other parts or features of gas chromatograph device 10. As such, when removable column holder 90 is removed from gas chromatograph device 10, only column 12 and the components of removable column holder 90 may be removed from gas chromatograph device 10. Removable column holder 90 may be configured to allow removing and interchanging of column 12 within removable column holder 90. This may be a simple process, where removable column holder 90 is slit out of cartridge slot 88, where column 12 can be easily accessed for exchanging with another column 12. This may include changing the column within removable column holder 90 or using a new removable column holder 90 with a new column 12. As such, removable column holder 90 can be configured to allow a user to install or exchange a new column 12 into gas chromatograph device 10 without the need for tools. Removable column holder 90 may be configured to protect column 12 within removable column holder 90 from mechanical damage and contamination due to handling. In other words, when removable column holder 90 with column 12 is removed from gas chromatograph device 10, removable column holder 90 may allow one to manipulate, store, transport, etc. column 12 in a safe environment because removable column holder 90 may protect column 12 from mechanical damage and contamination. Removable column holder 90 can be configured to reduce the possibility of error when installing column 12.

Housing 102 may be included with removable column holder 90 of gas chromatograph device 10. Housing 102 may be configured to contain column 12 in removable column holder 90. Housing 102 may contain column 12 inside with injector port pin 98 and detector pin 100 protruding therefrom. Wherein, housing 102 may be configured to keep a user from contaminating first tip 99 or second tip 101 of column 12. Injector port pin 98 and detector pin 100 may protrude from same side of housing 102, like on the back side of housing 102 as shown in the Figures. Whereby, when removable column holder 90 is inserted into gas chromatograph device 10, injector port pin 98 and detector pin 100 may seal to injector port 84 and detector 94, respectively, at the same time. In select embodiments, housing 102 may include plurality of holes, vents, slots, or combinations thereof 104 configured for air flow through column 12. In other select embodiments, housing 102 may include tab 106 configured for gripping removable column holder 90 to insert or remove removable column holder 90 from cartridge slot 88. Tab 106 may protrude from the opposite side of housing 102 as injector port pin 98 and detector pin 100. Tab 106 of housing 102 may also allow a user to manipulate removable column holder 90 with column 12 without contaminating or damaging column 12.

Cartridge slot 88 may be included in gas chromatograph device 10. Cartridge slot 88 may be for positioning removable column holder 90 with column 12 inside gas chromatograph device 10. Cartridge slot 88 may be configured to position injector port pin 98 and detector pin 100 for sealing with injector port 84 and detector 94, respectively. Cartridge slot 88 may include a casing configured to receive removable column holder 90 with column 12. This casing may include a width, depth and height slightly larger than removable column holder 90, to allow removable column holder 90 to be slid in and out of cartridge slot 88. The casing of cartridge slot 88 may include an open end or holes or slots configured to receive injector port pin 98 and detector pin 100 to allow connection with injector port 84 and detector 94, respectively. This casing of cartridge slot 88 may include various holes, vents, slots, or combinations thereof for allowing air flow into column 12 inside removable column holder 90. For providing air flow around column 12, these various holes, vents, slots, etc. may, but are not required to, match up or align with the plurality of holes, vents, slots, or combinations thereof 104 of housing 102 of removable column holder 90. These various holes, vents, slots, etc. of cartridge slot 88 may include, but are not limited to, a hole for positioning heating element or coil 16 of inductive heating source 14 around column 12, like below column 12, as shown in the Figures.

Locking mechanism 92 may be included with gas chromatograph device 10. Locking mechanism 92 may be configured for securing removable column holder 90 with column 12 inside cartridge slot 88 in gas chromatograph device 10. In select embodiments, locking mechanism 92 may provide force on housing 102 of removable column holder 90. This force on housing 102 may provide force to injector port pin 98 and detector pin 100 configured for creating first and second air tight seals 112 and 114 between injector port 84 and detector 94, respectively. As shown in the Figures, in select embodiments, locking mechanism 92 may include, but is not limited to, having mechanical latch 122 with lever 123 configured to engage cartridge slot 88 (or cover 82 or frame 80) for securing removable column holder 90 into cartridge slot 88 with force to engage sealing system 116.

Sealing system 116 may be included with removable column holder 90 of gas chromatograph device 10. Sealing system 116 may be for sealing the respective ends (first tip 99 and second tip 101) of column 12 with injector port 84 and detector 94. Sealing system 116 may be configured to allow gas flow from injector port 84 into column 12 via injector port pin 98, and from column 12 into detector 94 via detector pin 100. Sealing system 116 may be configured to allow the detection of compounds that may only be present in low levels. In select embodiments of sealing system 116, injector port pin 98 may be connected to first tip 99 of column 12 at one end. Injector port pin 98 may be configured to provide first air tight seal to injector port 84 of gas chromatograph device 10. Likewise, detector pin 100 may be connected to second tip 101 of column 12 at its other end. Detector pin 100 may be configured to provide second air tight seal to detector 94 of gas chromatograph device 10. In select embodiments, sealing system 116 may include springs on each of injector port pin 98 and detector pin 100 to engage injector port 84 and detector 94 independently to overcome tolerance issues between different removable column holders 90 and columns 12. In select embodiments, as shown in the Figures, detector O-ring 108 and injector O-ring 110 may also be included. Detector O-ring 108 may be configured for sealing detector pin 100 of column 12 to detector 94 when removable column holder 90 is inserted and locked in cartridge slot 88. Likewise, injector O-ring 110 may be configured for sealing injector port pin 98 of column 12 to injector port 84 when removable column holder 90 is inserted and locked in cartridge slot 88. Detector O-ring 108 and injector O-ring 110 may be configured to seal to detector 94 and injector port 84, respectively, in face sealing arrangement (sealed on the top of the O-rings) and/or plug sealing arrangement (sealed on the outer edges of the O-rings). In select embodiments, injector port pin 98 and detector pin 100 may include tapered features configured for sealing or aiding in sealing to injector port 84 and detector 94, respectively.

Positioning system 200 for the inlet liner 202 and the column 12 may be included in gas chromatograph device 10. Positioning system 200 for the inlet liner and column 12 may be configured to position the inlet liner and column 12 with respect to one another. As a result, positioning system 200 may be designed to repeatably and optimally position the inlet liner and column 12 with respect to one another. In select embodiments, positioning system 200 may position the inlet liner in a perpendicular orientation to column 12. The perpendicular orientation of the inlet liner with respect to column 12 may be configured to minimize contamination on column 12.

An inductive heating source 14 may be included in gas chromatograph device 10. Inductive heating source 14 may be configured to directly or indirectly heat column 12. As disclosed herein, direct inductive heating of column 12 would be applying an inductive current directly to column 12 for heating column 12. On the other hand, as disclosed herein, indirect inductive heating of column 12 would be applying an inductive current to a material or device around column 12 for heating column 12. The inductive heating source 14 may include inductive heating element or coil 16. As such, the inductive heating element or coil 16 may be configured to induce current directly or indirectly in column 12. Wherein, column 12 in the gas chromatograph device 10 may be inductively heated via inductive heating source 14. One feature or benefit of the instant gas chromatograph device 10 may be that it does not require an oven to heat column 12. Prior to the instant disclosure, GC columns were hung in a convection oven that resides within the GC device. Thus, convection heating via air ovens and resistive elements has been the norm. However, these ovens require large spaces and thus take time to heat these spaces up. The instant disclosure of miniature gas chromatograph device 10 utilized inductive heating of column 12 and, thus, does not include an oven. This feature may reduce the time and space required for these convection heating ovens required for prior gas chromatograph devices. As a result, in one aspect, the instant disclosure is directed to gas chromatograph device 10 that has miniaturized dimensions or miniature gas chromatograph 10. Miniature gas chromatograph 10 may be a gas chromatograph that is smaller in size than known standard gas chromatographs.

Figure 2:
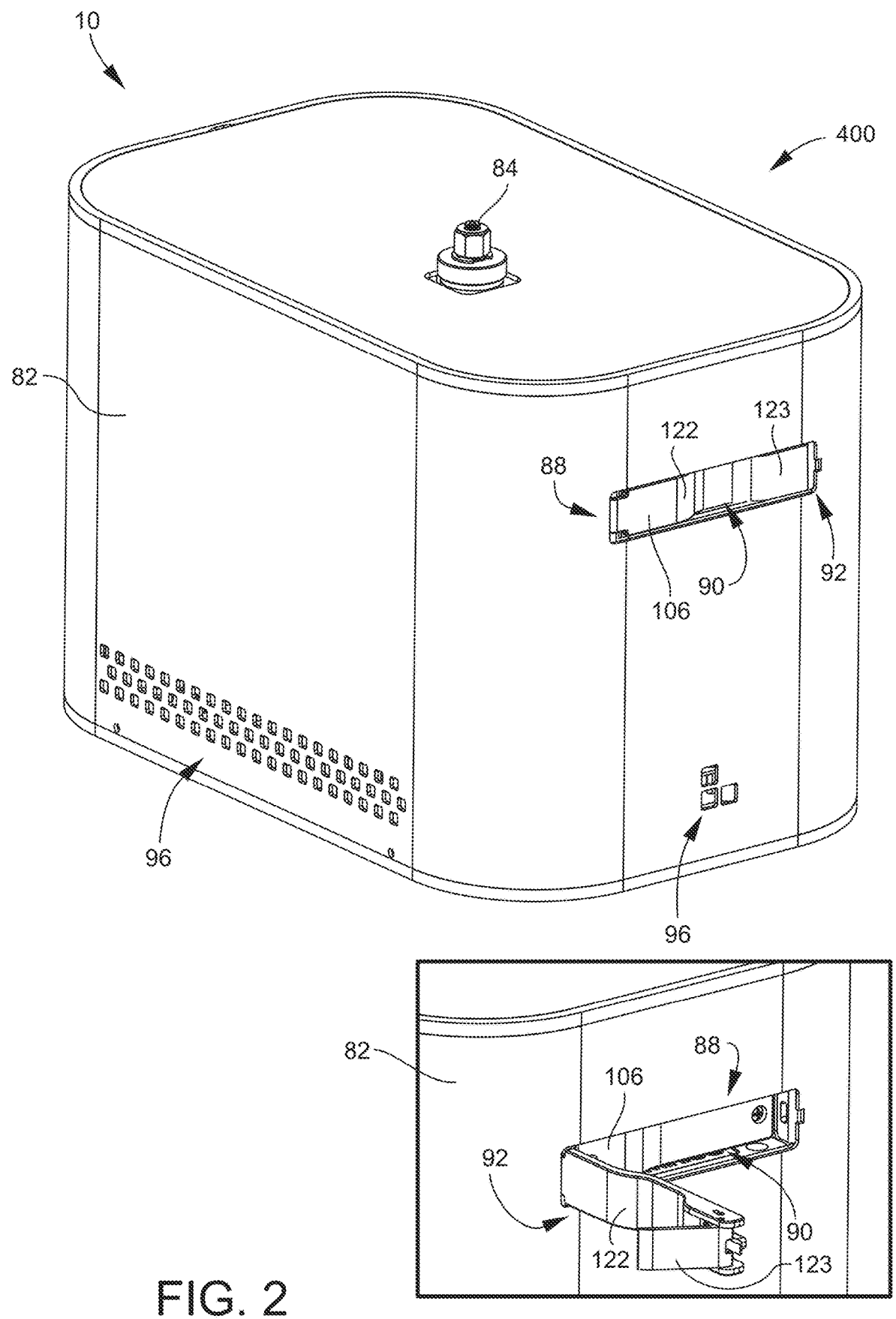
FIG. 2 is another perspective front top view of the gas chromatograph device of FIG. 1 from the other side with the locking mechanism locked and unlocked below.
Figure 3:
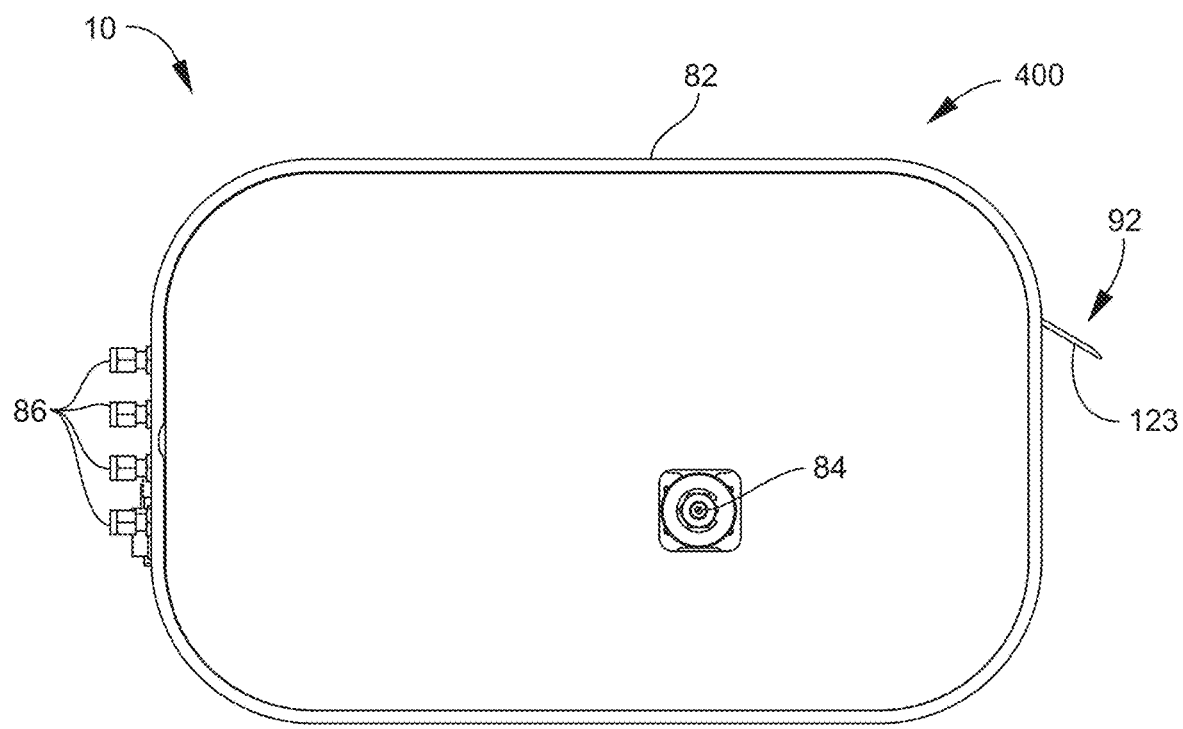
FIG. 3 is a top view of the gas chromatograph device of FIG. 1.
Figure 4:
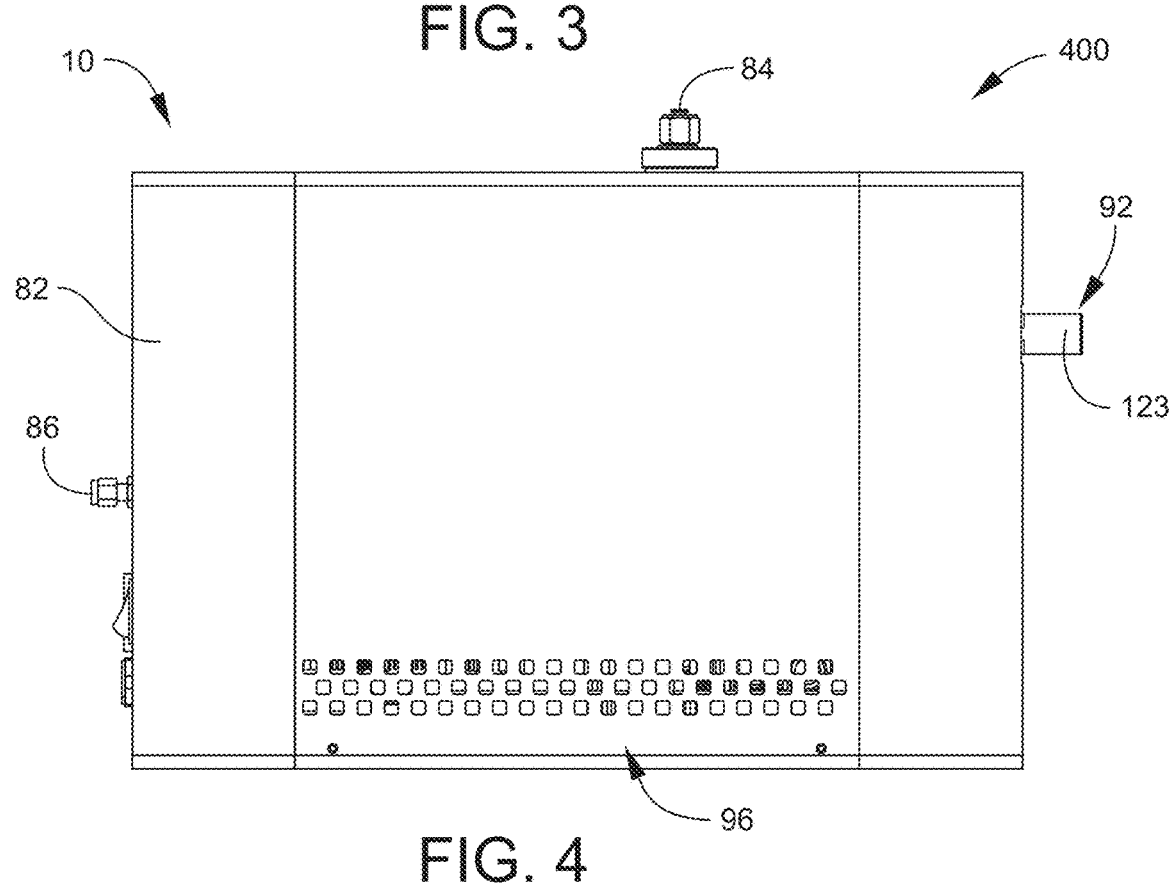
FIG. 4 is a left side view of the gas chromatograph device of FIG. 1.
Figure 5:
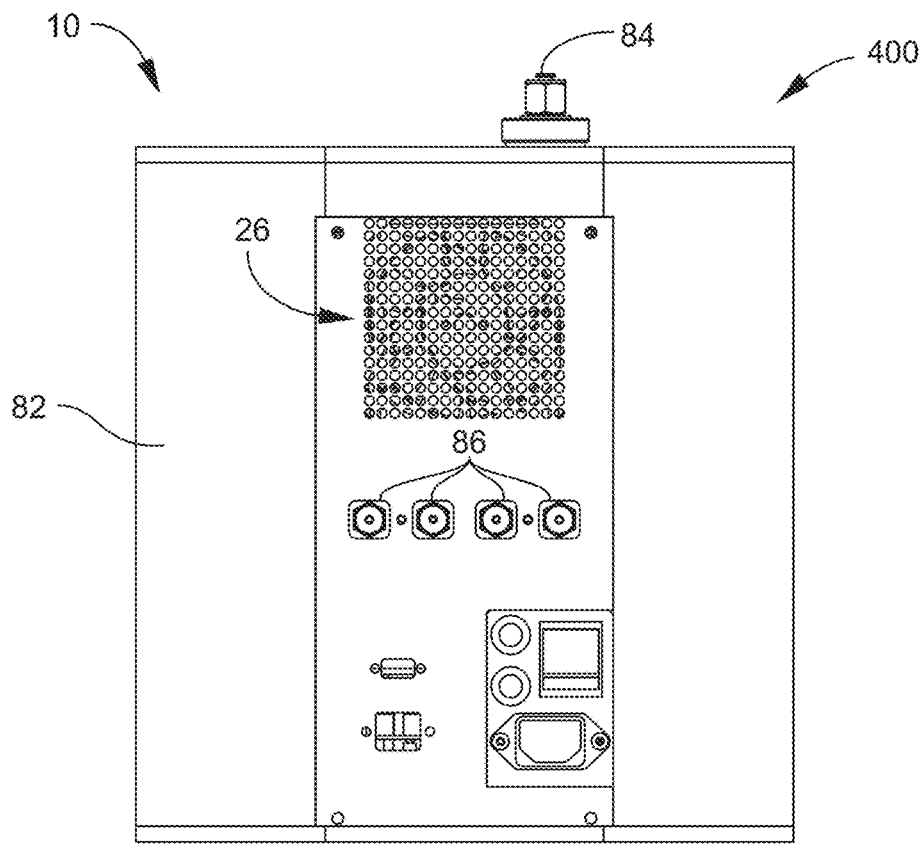
FIG. 5 is a rear view of the gas chromatograph device of FIG. 1.
Figure 6:
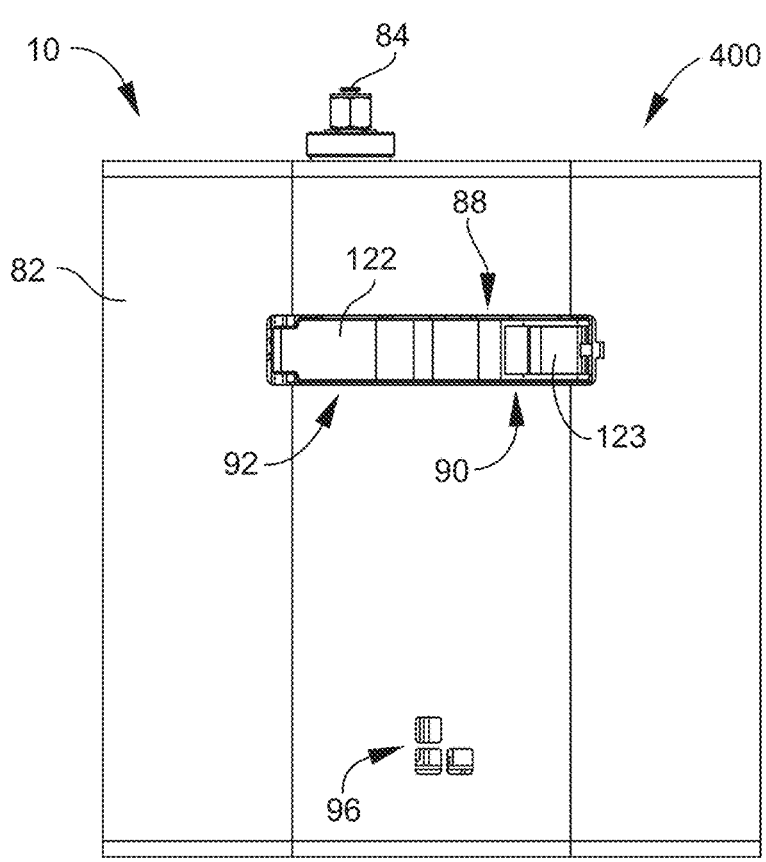
FIG. 6 is a front view of the gas chromatograph device of FIG. 1.
Figure 7:
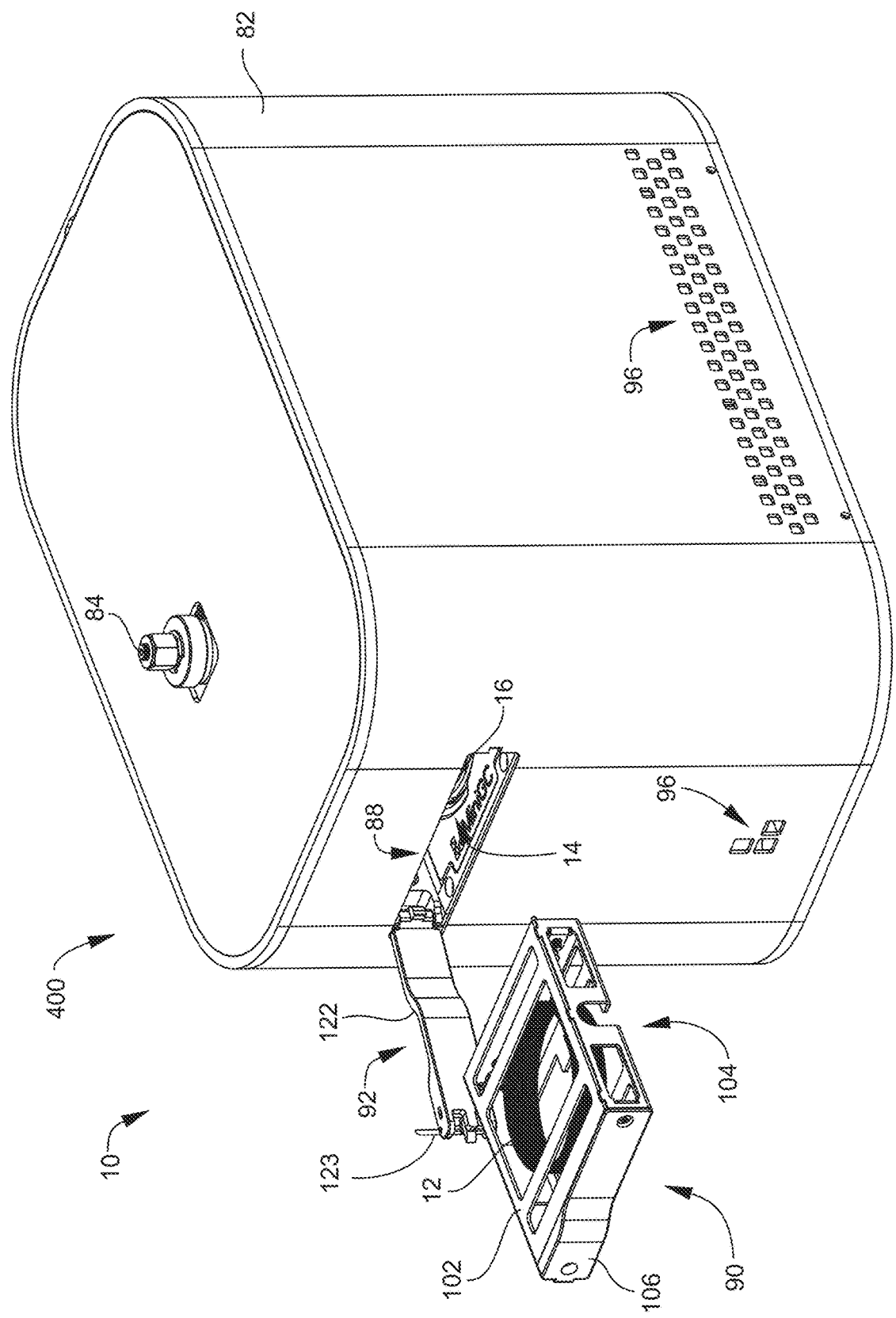
FIG. 7 is a perspective front top view of select embodiments of the gas chromatograph device according to select embodiments with the locking mechanism unlocked and the removable column holder partially removed.
Figure 8:
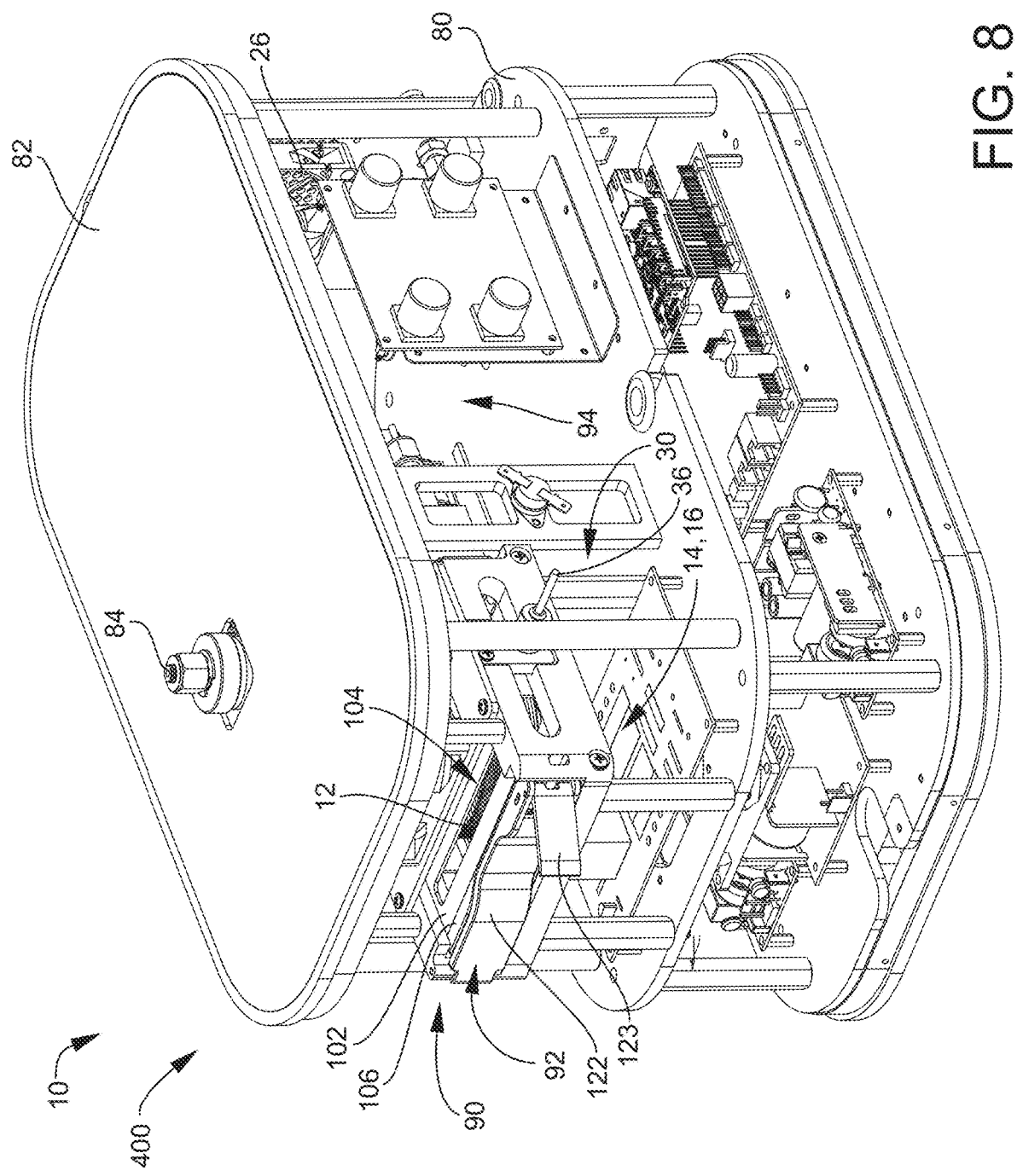
FIG. 8 is a perspective front top view of select embodiments of the gas chromatograph device according to the instant disclosure with the cover removed.
Figure 9:
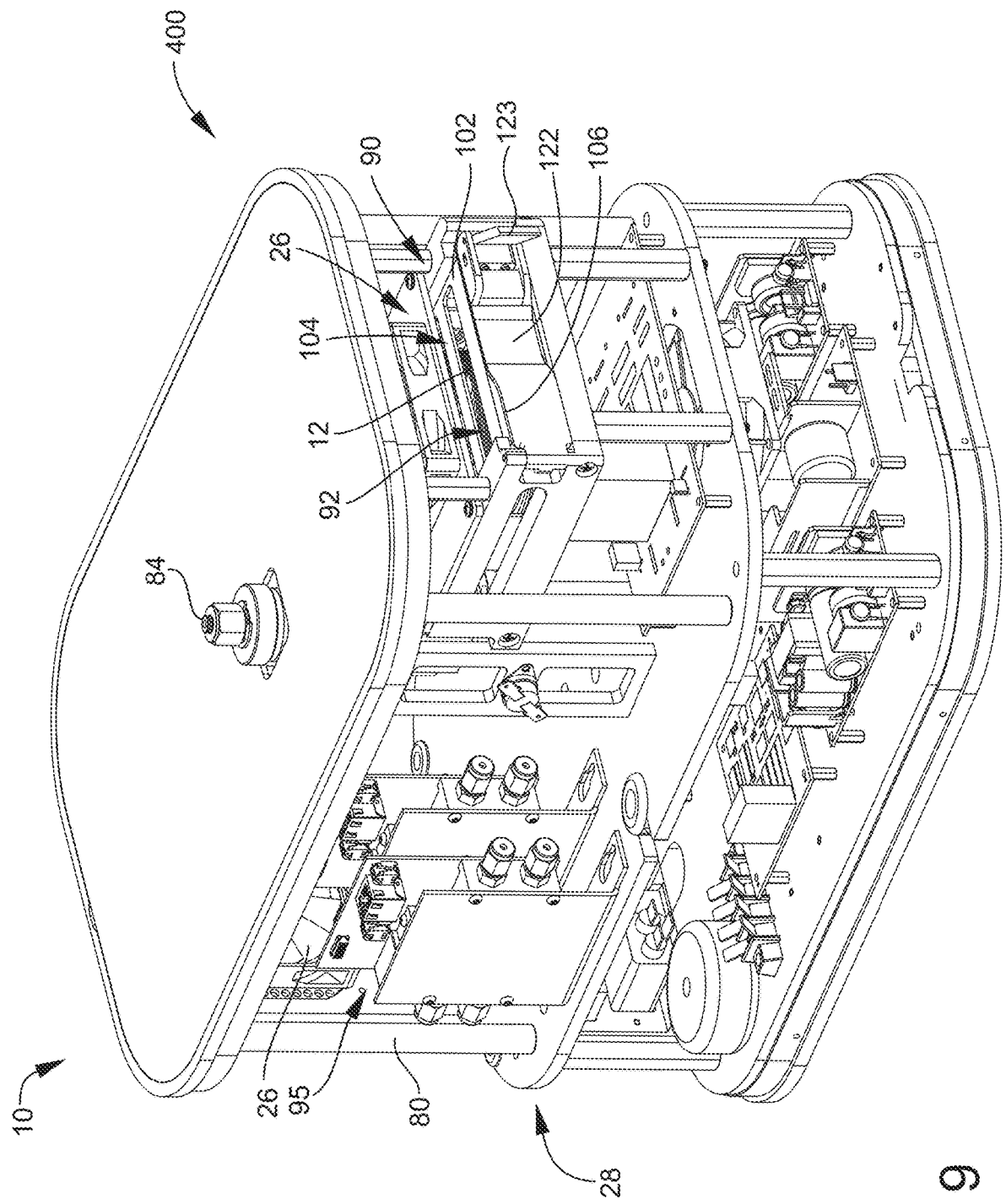
FIG. 9 is another perspective front top view of the gas chromatograph device of FIG. 8 from the other side.
Figure 10:
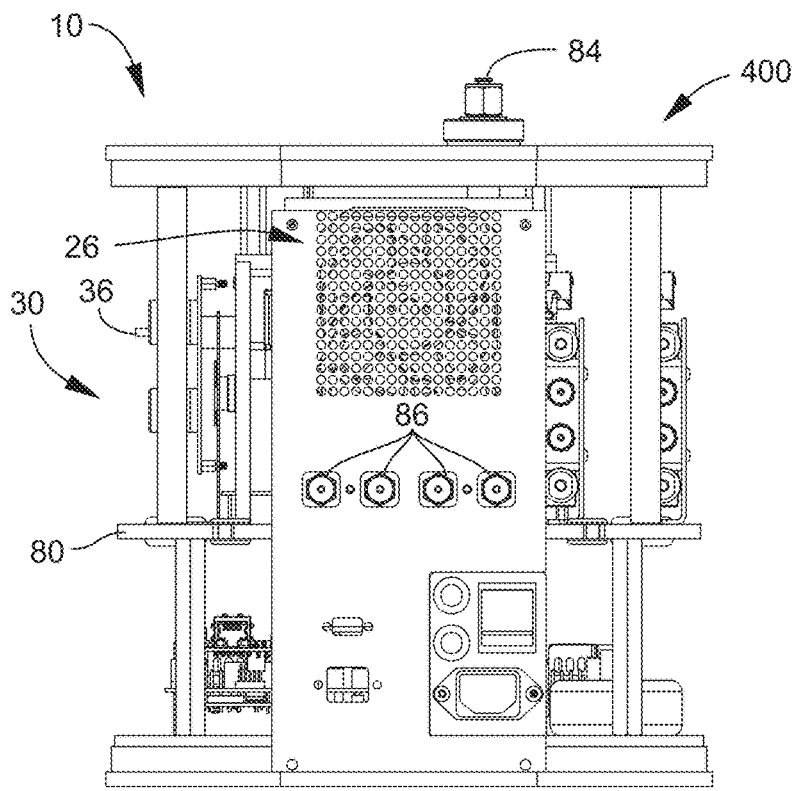
FIG. 10 is a rear view of the gas chromatograph device of FIG. 8.
Figure 11:
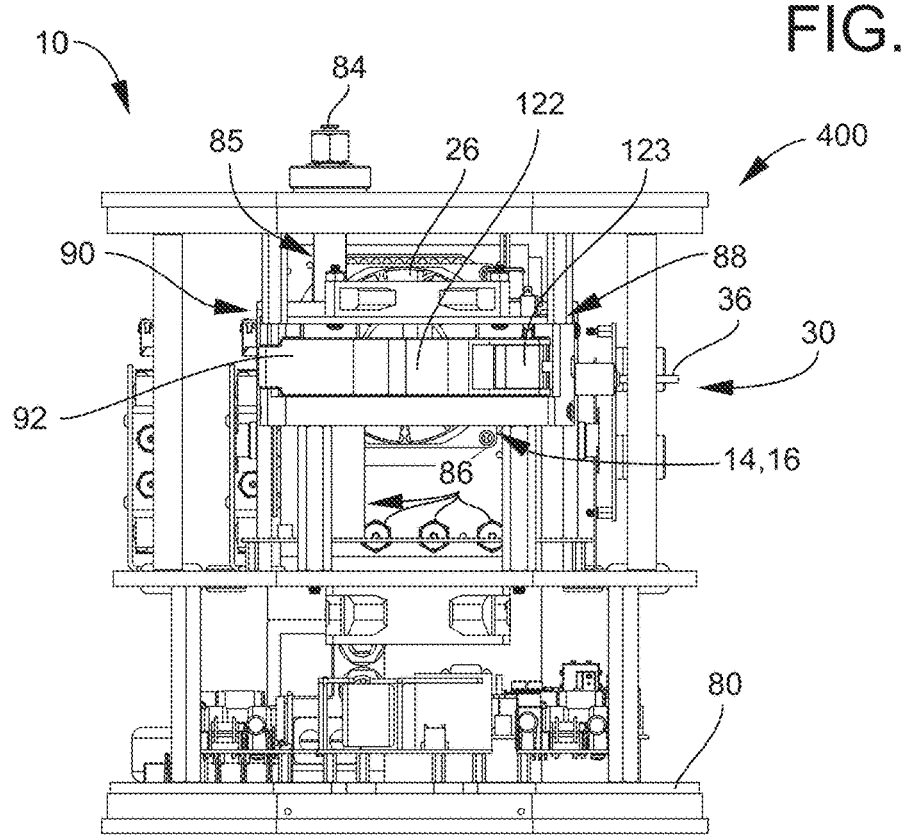
FIG. 11 is a front view of the gas chromatograph device of FIG. 8.
Figure 12:
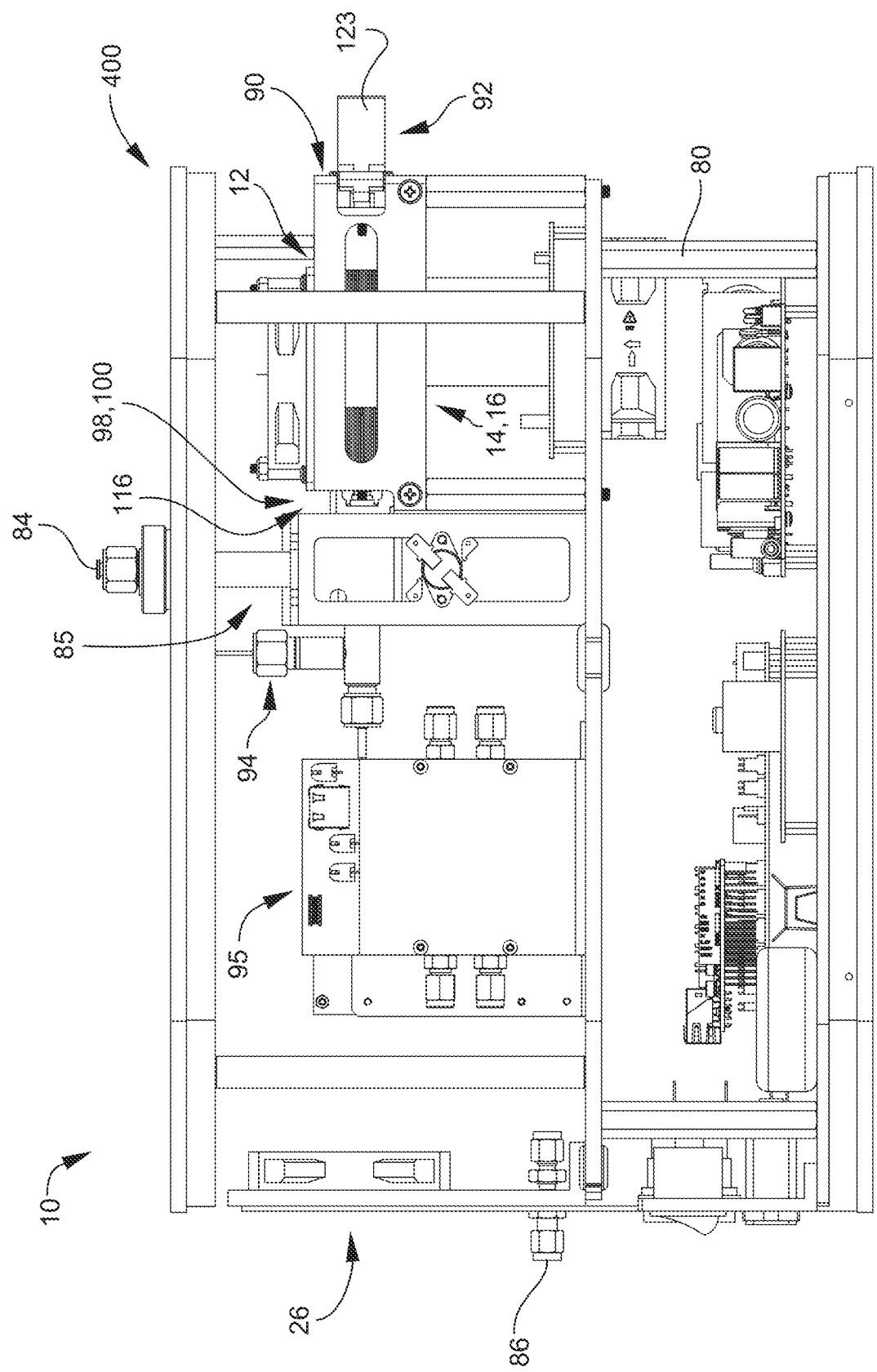
FIG. 12 is a left side view of the gas chromatograph device of FIG. 8.
Figure 13:
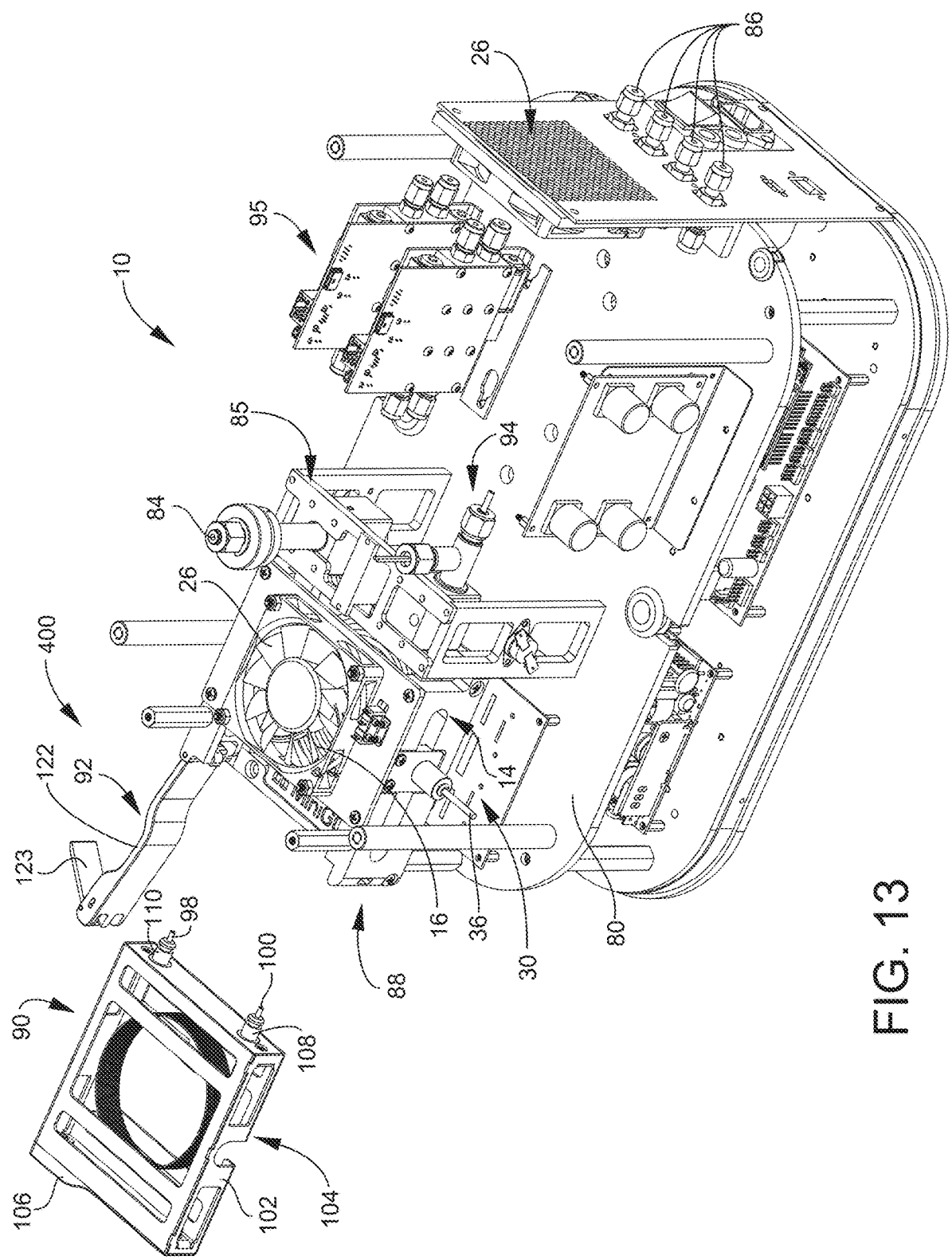
FIG. 13 is a perspective rear top view of select embodiments of the gas chromatograph device according to the instant disclosure without the cover and with the locking mechanism unlocked and the removable column removed.
Figure 14:
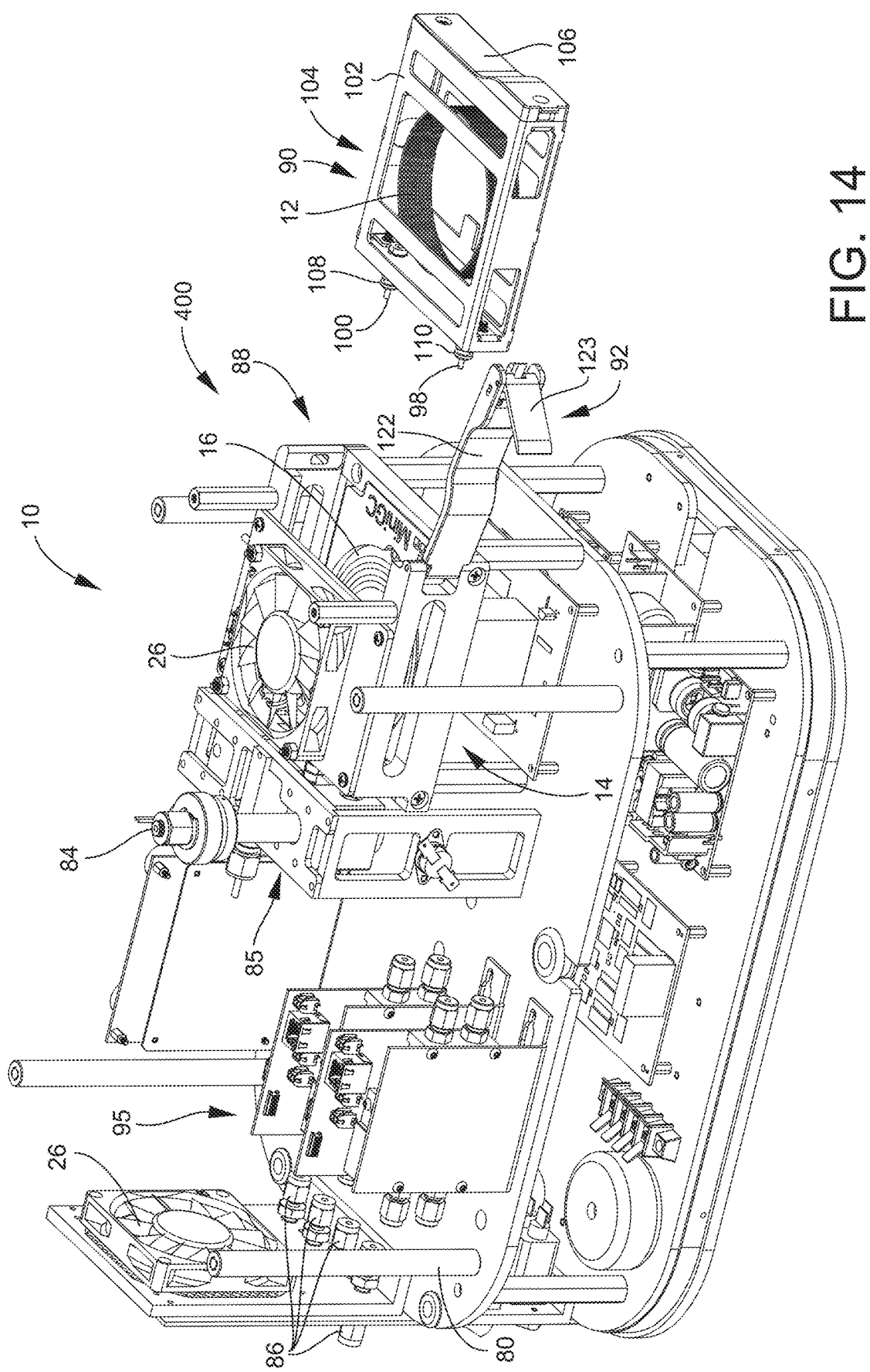
FIG. 14 is a perspective front top view of the gas chromatograph device of FIG. 13.
Figure 15:
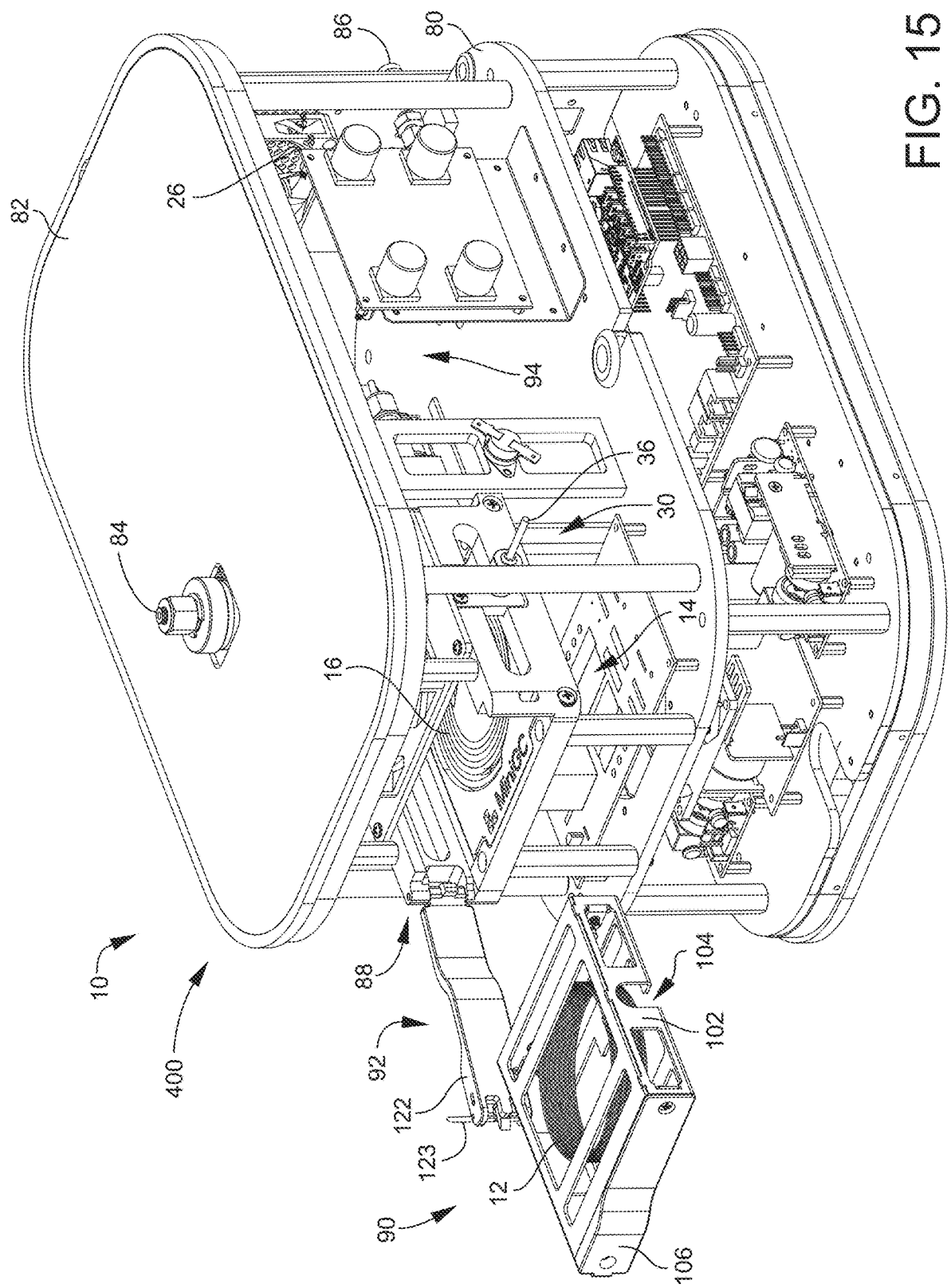
FIG. 15 is a perspective front top view of select embodiments of the gas chromatograph device of FIG. 13 with the cover partially removed except for the top, and with the locking mechanism unlocked and the removable column partially removed.
Figure 16:
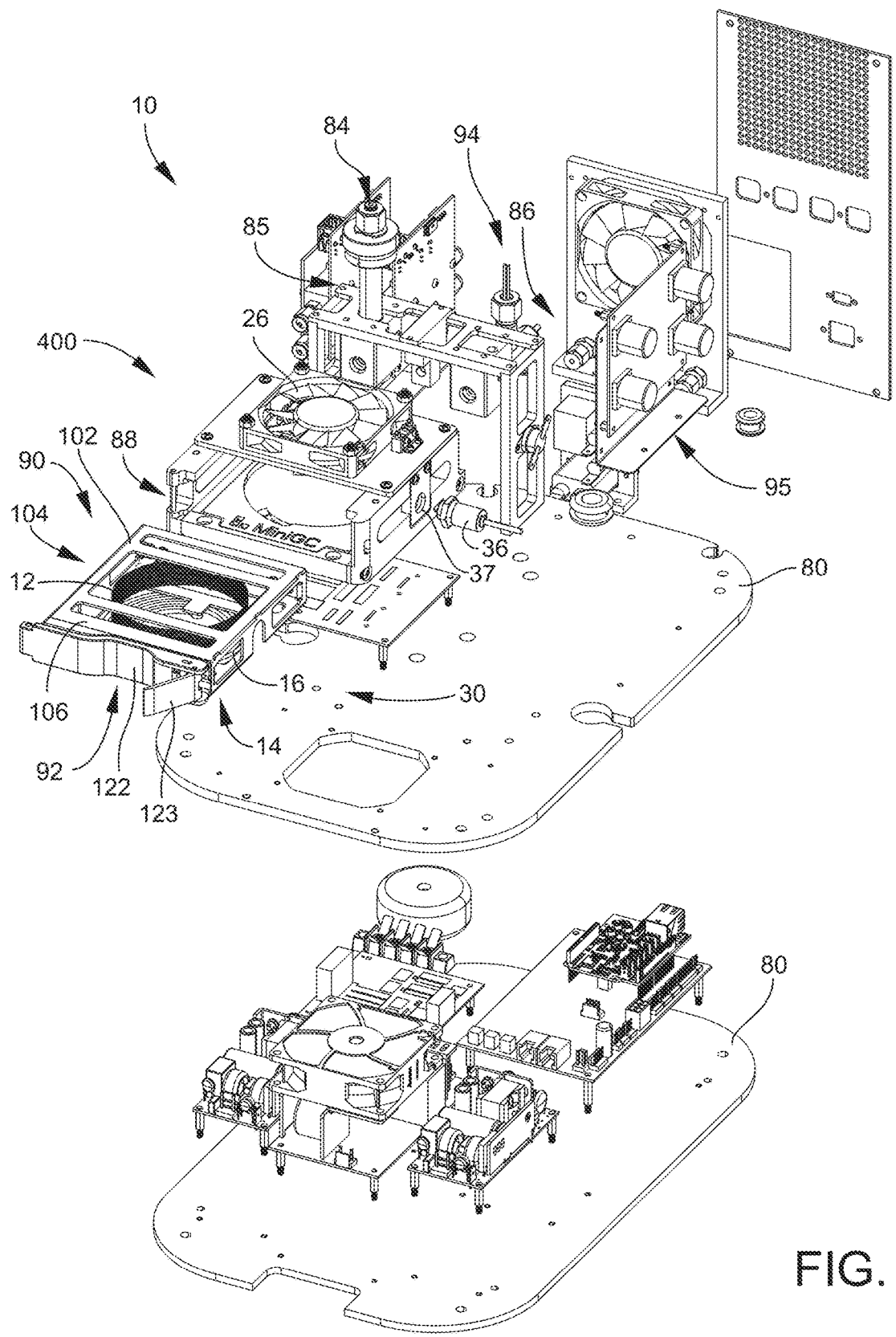
FIG. 16 is a partially disassembled perspective front top view of select embodiments of the gas chromatograph device according to the instant disclosure.

Referring to FIGS. 1-7, the overall size and shape of select embodiments of the instant gas chromatograph device 10 is shown with the cover on. Referring to FIGS. 8-16, the overall size and shape of select embodiments of the instant gas chromatograph device is shown with the cover removed. These Figures show different perspectives of the overall Mini GC 10. FIG. 1 shows the front of the unit where the removable column holder 90 may be inserted into the system. In FIGS. 1 and 2, the removable column holder 90 is in the system and locking mechanism 92 is shown in a locked position in the top diagram and in an unlocked position in the bottom diagram, where the locking mechanism is swung out for accessing the removable column holder 90 inside cartridge slot 88. However, the instant disclosure is not so limited to this embodiment of locking mechanism 92, and other designs for engaging and disengaging the locking mechanism 92 on the removable column holder 90 may be provided. The chimney looking thing shown sticking up from the top of the unit is the top of injector port 84. This may be where the user would inject a sample from a syringe. On the back of the system, which can be seen in FIG. 5, you can see four gas fittings 86. These are the fittings where the needed gases (Helium, Hydrogen, Purified Compressed Air, or other needed gases) are plumbed into the system. The other openings may be for fans 26 and air movement.

Gas chromatograph device 10 may have a length, a width, and a height. Any and/or all of these dimensions may be smaller than the known standard gas chromatographs for making the instant mini GC 10. In select embodiments, the total volume provided by the length, the width, and the height may be less than 20 cubic feet. In other select embodiments, the total volume provided by the length, the width and the height may be less than 10 cubic feet. In other select possibly preferred embodiment, as shown in the Figures, the total volume provided by the length, the width and the height may be approximately or equal to 1.08574 cubic feet. In select embodiments, the length may be less than 4 feet, the width may be less than 4 feet, and/or the height may be less than 4 feet. In other select embodiments, the length may be less than 3 feet, the width may be less than 2 feet, and/or the height may be less than 2 feet. In other select possibly preferred embodiments, as shown in the Figures, the length may be approximately or equal to 16.4 inches, the width may be approximately or equal to 10.4 inches, and the height may be approximately or equal to 11.0 inches. However, the disclosure is not so limited, and any desired shape and/or sizes of gas chromatograph 10 may be provided.

As a result of these smaller or miniaturized dimensions, the instant gas chromatograph 10 may be designed to provide a smaller more portable gas chromatograph that will allow for the unit to take up minimum space and thus be more readily available to multiple users inside and outside of academia and/or industrial labs.

Referring now to FIGS. 8, 9, 11-16, inductive heating source 14 with inductive heating element or coil 16 may be included for inductively heating column 12. In select embodiments, as shown in the Figures, inductive heating element or coil 16 may be configured to induce a current directly into skin of outer layer of column 12. Skin of outer layer of column 12 may be any material configured for inductive heating. In select embodiments, skin of outer layer of column 12 may be metal or silica. In select possibly preferred embodiments, skin of outer layer of column 12 may be metal. Column 12 may be any known or later discovered column configured for gas chromatography. In select embodiments, column 12 may be a metal or silica column configured for gas chromatography. Column 12 may be provided in any desires shape or form configured for gas chromatography. In select embodiments, as shown in the Figures, column 12 may be provided in a coiled form. In select embodiments, the inductive heating element or coil 16 may be configured to directly heat column 12 controllably up to needed temperature. Needed temperature may be any needed or required temperature for gas chromatography in column 12. In select embodiments, the inductive heating element or coil 16 may be configured to directly heat column 12 controllably up to needed temperature and hold column 12 at needed temperature, like for specific durations for gas chromatograph within column 12. This may be controlled by various sensors and processors, as shown in the Figures.

Referring now to FIGS. 5 and 8-16, at least one fan 26 may be included in gas chromatograph device 10. Wherein, the inductive heating element or coil 16 may be configured to allow gas chromatograph device 10 to cool column 12 by turning off inductive heating element or coil 16 and blowing or fanning cool air 28 over the column via the fans 26. This may be controlled by various sensors and processors, as shown in the Figures. In select embodiments, as shown in the Figures, two fans 26 may be included in gas chromatograph device 10. In select embodiments, as shown in the Figures, one fan 26 may be included at the rear of the unit and positioned behind a grate or screen for forcing cool air 28 into or out of cover 82 from the rear. Another fan 26 may be included above cartridge slot 88 for forcing air over column 12 when removable column holder 90 is positioned inside cartridge slot 88. Frame 80 of gas chromatograph device 10 may be included, as shown in the Figures, with minimal design and various slots, holes, notches, etc. for allowing air flow through gas chromatograph device 10.

Temperature sensor 30 may be included in select embodiments of gas chromatograph device 10. See FIGS. 8-16. Temperature sensor 30 may be for measuring the temperature of column 12, including, but not limited to, measuring temperature 32 of surface of inductively heated column 12. Temperature sensor 30 may be configured for noncontact, direct temperature measurement of column 12. As such, temperature sensor 30 may be positioned inside gas chromatograph device 10 in any position with a line of sight of column 12 when removable column holder 90 is positioned in cartridge slot 88. As shown in FIGS. 8, 10, 11, 13, 15 and 16, temperature sensor 30 may be mounted in temperature sensor mount 37 on the side of cartridge slot 88. Temperature sensor mount 37 may include a hole configured for receiving temperature sensor 30. This position of temperature sensor mount 37 may provide a clear line of sight of column 12 when positioned in removable column holder 90 in cartridge slot 88 via holes, vents, slots 104 of housing 102 of removable column holder 90. Wherein, temperature sensor 30 may be configured to read surface temperature of surface of column 12 without touching column 12. In select embodiments, inductive heating source 14 may be configured to be controlled by temperature sensor 30. In these embodiments, inductive heating of column 12 may be controlled by the noncontact, direct temperature measurement of column 12. Temperature sensor 30 may be any temperature sensor configured for reading the temperature of column 12. In select embodiments, temperature sensor 30 may be infrared temperature sensor 36, as shown in FIGS. 8, 10, 11, 13, 15 and 16. Infrared temperature sensor 36 may be any infrared sensor or like sensor, configured for noncontact, direct temperature measurement of column 12

Referring to FIGS. 8-16, frame 80 may be included in gas chromatograph device 10. Frame 80 may be for supporting the components and structures of gas chromatograph device 10. As shown in the Figures, frame 80 may be configured for minimum size and structure of gas chromatograph device 10. Frame 80 may include various passageways and air ways for circulating cool air 28 via fans 26 and in and out of vent holes 96 in cover 82. In select embodiments, frame 80 may include two layers, where the top layer may be configured for gas chromatography, and the bottom layer may be configured for the processors for controlling gas chromatography of mini GC 10.

Referring now to FIGS. 1-7, cover 82 may be included with the instant gas chromatograph device 10. Cover 82 may be for protecting the inside components and parts from the outside environment. Cover 82 may include side components as well as a top component. Cover 82 may include vent holes 96 in various positions around cover 82 configured for allowing cool air 28 to flow in and out of gas chromatograph device 10. Cover 82 may include a slot sized to receive removable column holder 90 into cartridge slot 88.

Referring now to FIGS. 1-16, injector port 84 may be included with the instant gas chromatograph device 10. Injector port 84 may be for inserting or injecting the fluid to be analyzed or conducted gas chromatography on, inside gas chromatograph device 10. As shown in the Figures, injector port 84 may be positioned through the top of cover 82 for inserting or injecting the gas inside gas chromatograph device 10. Injector port 84 may be any known or standard injector port for GCs. In select embodiments, injector port 84 may include injection manifold 85. See FIGS. 11-14 and 16. Injection manifold 85 may be for controlling the fluid injected through injector port 84 with fluid introduced into column 12. As such, injection manifold 85 may be in fluid communication with column 12 via injector port pin 98. See FIGS. 13, 14 and 17.

Referring to FIGS. 3-5, 10, and 12-16, gas fittings 86 may be included with the instant gas chromatograph device 10. Gas fittings 86 may be for introducing additional fluids or carrier gases into the gas chromatography process inside mini GC 10. Gas fittings 86, may be positioned on the back of gas chromatograph device 10, as shown in the Figures. In gas chromatography inside mini GC 10, the mobile phase (or "moving phase") may be a carrier gas, usually an inert gas such as helium or an unreactive gas such as nitrogen. Helium remains the most commonly used carrier gas in most common instruments, however hydrogen may be preferred for improved separations. Gas fittings 86 may be the fittings where the needed gases (Helium, Hydrogen, Purified Compressed Air, or other needed gases) are plumbed into the system of gas chromatograph device 10.

Referring now to FIGS. 1-2, 6-9, and 11-25, removable column holder 90 may be included with the instant gas chromatograph device 10. Removable column holder 90 may be for holding column 12. Removable column holder 90 may allow for easy and quick removal and insertion of column 12 to and from cartridge slot 88 of gas chromatograph device 10. Removable column holder 90 may include housing 102 configured to secure column 12 inside removable column holder 90. Housing 102 may include plurality of holes, vents, slots 104, etc. for providing air flow through column 12. Housing 102 may include tab 106 on the outer side of removable column holder 90. Tab 106 may be for manipulating or gripping removable column holder 90, like for inserting and removing removable column holder 90 to and from cartridge slot 88 of gas chromatograph device 10. Removable column holder 90 may include detector o-ring 108 for sealing detector pin 100 to detector 94 (or lines thereto) when removable column holder 90 is inserted into cartridge slot 88 of gas chromatograph device 10. Likewise, removable column holder 90 may include injector o-ring 110 for sealing injector port pin 98 with injector port 84 (or lines thereto) when removable column holder 90 is inserted into cartridge slot 88 of gas chromatograph device 10. Locking mechanism 92 may be included with gas chromatograph device 10. Locking mechanism 92 may be for securing removable column holder 90 inside cartridge slot 88 of gas chromatograph device 10. Locking mechanism 92 may be any device or mechanisms configured for securing removable column holder 90 inside cartridge slot 88 of gas chromatograph device 10. As shown in the Figures, locking mechanism 92 may be a latch system configured to hinge from one side of cartridge slot 88 to the other side for securing removable column holder 90 inside cartridge slot 88.

The instant disclosure is designed to provide a system that is a GC that utilizes removable GC column holder 90 that is small, lightweight, low cost, with an easily removable column, and able to handle a wide variety of GC columns 12. This removable column holder 90 may be unique in that the column holder only holds the column, making it the smallest, lightest, and lowest cost possible. Also, the removable column holder 90 may be very easy to interchange columns 12 into the cartridge and may allow the user to affordably interchange many columns 12. The removable column holder 90 may also protect the fragile column 12 from mechanical damage and contamination due to handling that is common for columns not in holders.

Referring to FIGS. 1-2, 6-9, 11-20 and 23-25, cartridge slot 88 may be included with the instant gas chromatograph device 10. Cartridge slot 88 may be for receiving and removing removable column holder 90 in and out of gas chromatograph device 10. As such, cartridge slot 88 may be configured to receive removable column holder 90 with column 12. Cartridge slot 88 may be designed and sized to receive removable column holder 90. Wherein, the inductive heating source 14 may be positioned above, below, or around cartridge slot 88. In select possibly preferred embodiments, the inductive heating source 14 may be positioned below cartridge slot 88, as shown in the Figures.

Detector 94 may be included in gas chromatograph device 10. See FIGS. 8, 9, and 12-16. Detector 94 may be used for detection during or after the gas chromatography process. As the compounds separate based on their rate of progress through column 12 they will exit column 12 through detector pin 100 and go into detector 94 where detector 94 may report the intensity of each compound which correlates to the amount of that compound. Detector 94 may include detector board 95.

Figure 18:
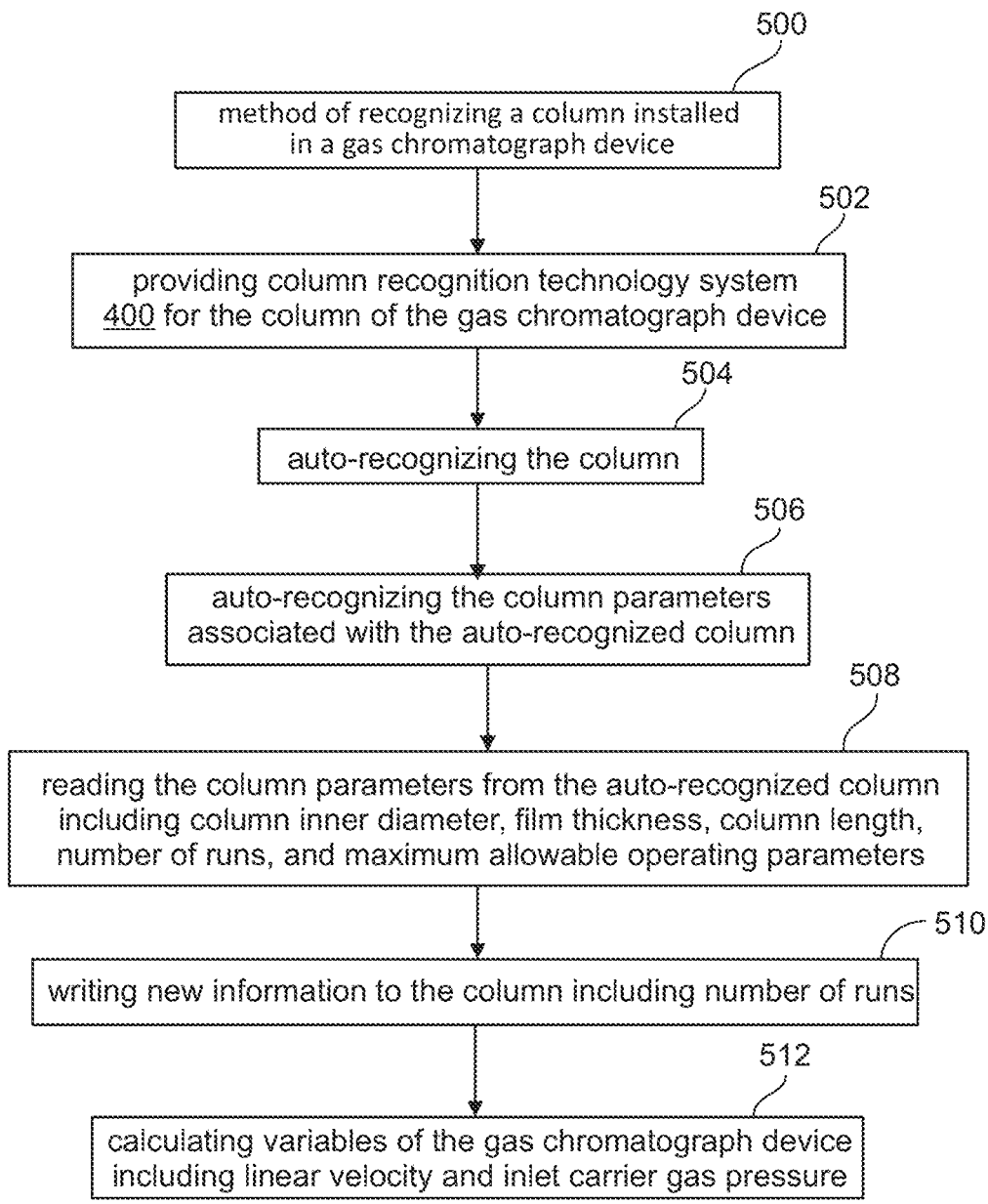
FIG. 18 is a flow diagram of select embodiments of the method of recognizing a column inserted or installed in a gas chromatograph device according to select embodiments of the instant disclosure.

Referring now to FIG. 18, in another aspect, the instant disclosure embraces method 500 of recognizing a column installed in a gas chromatograph device 10. Method 500 may include any steps or procedures for inserting or installing column 12 into gas chromatograph device 10. Method 500 of recognizing a column (like column 12) of a gas chromatograph device (like gas chromatograph device 10) may generally include step 502 of providing column recognition technology system 400 for column 12 in gas chromatograph device 10 in any of the various embodiments shown and/or described herein. In general, the provided column recognition technology system 400 may include gas chromatograph device 10 with column 12 configured for gas chromatography. Column 12 may include column parameters 412 associated with column 12. Column recognition technology system 400 may be configured to auto-recognize column 12 in gas chromatograph device 10. Two-way communication 402 may be included between gas chromatograph device 10 and auto-recognized column 12. Wherein, method 500 of recognizing column 12 inserted or installed in gas chromatograph device 10 may further include: step 504 of auto-recognizing column 12; and step 506 of auto-recognizing column parameters 412 associated with the auto-recognized column 12.

In select embodiments of method 500 of recognizing column 12 inserted or installed in gas chromatograph device 10, method 500 may further include: step 508 of reading column parameters 412 from the auto-recognized column 12 including, but not limited to, column inner diameter 414, film thickness 416, column length 418, number of runs 420, maximum allowable operating parameters 422, the like, and combinations thereof; step 510 of writing new information to column 12 including number of runs 420; and step 512 of calculating variables 424 of gas chromatograph device 10 including, but not limited to, linear velocity 426, inlet carrier gas pressure 428, maximum temperature 430, the like, and combinations thereof.

In sum, the instant disclosure may be directed to gas chromatograph device 10 with column recognition technology system 400 for column 12 of gas chromatograph device 10, and method 500 of recognizing column 12 inserted or installed in gas chromatograph device 10. See FIGS. 1-17. The instant disclosure is designed to provide a system that is a GC that utilizes column recognition technology system 400 that is small, lightweight, low cost, with an easily removable column, and able to handle a wide variety of GC columns. Column recognition technology system 400 may be designed and/or configured to identify, recognize, and/or track the columns 12 being used in gas chromatograph device 10. In select embodiments, gas chromatograph device 10 may utilize column recognition technology system 400 to auto-recognize GC column 12 and associated parameters 412 of that column 12. In other select embodiments, gas chromatograph device 10 may include two-way communication 402 between system 400 and columns 12. In this embodiment, two-way communication 402 may allow gas chromatograph device 10 to read stored information from the columns 12 as well as write new information to the columns 12.

Column recognition technology system 400 of the instant disclosure may be significant for several reasons, including, but not limited to: 1) it may allow for much easier programming of gas chromatograph device 10 by automatically inputting parameters 412 of column 12 into the software so the user has much less to program when running the system; 2) it may improve performance of gas chromatograph device 10 by being able to suggest other operating parameters based on the column 12 being used; 3) it may increase column lifetime and decrease system issues by warning the user against operating parameters that are not compatible with certain column types (such as high column temperatures for temperature sensitive columns); 4) it may enable users to see how close a column 12 is to the end of its lifetime based on the number of runs 420; the like, etc.

Prior to the instant disclosure of column recognition technology system 400 for gas chromatograph device 10, gas chromatograph device 10 itself had no idea what column 12 was in the system. As such, prior to the instant disclosure, gas chromatograph device 10 would have had to run blindly on the parameters the users have input to the system such as linear velocity 426, inlet gas pressure 428, flow rate, temperature settings and ramps. As such, prior to the instant disclosure, it was up to the user to understand to read this information on column 12 he or she is using and use this information to calculate input values for these different needed operating parameters. In many cases, prior to the instant disclosure, the user had to rely upon online resources or look up table to make some of these calculations themselves. This meant that, prior to the instant disclosure, operation typically required a trained professional and there was a lot of risk of getting bad data or damaging the column based on incorrect entry of these parameters.

To solve these problem, the instant disclosure includes column recognition technology system 400 with RFID tag 408 (or other wireless communication device) on all of the columns 12, or removable column holders 90, that allows the gas chromatograph device 10 to pull or read stored information from column 12 including column inner diameter 414, film thickness 416, column length 418, number of runs 420, and maximum allowable operating temperatures 422. This stored information can then be used to automatically calculate many needed variables 424 such as linear velocity 426 and inlet carrier gas pressure 428 as well as limit other input parameters like maximum temperatures 430 so as to ensure the best performance and limit damage to column 12.

As a result, the instant disclosure of column recognition technology system 400 for gas chromatograph device 10 may allow anyone to operate gas chromatograph device 10 without any knowledge of optimal flow rates and linear velocities. With column recognition technology system 400, gas chromatograph device 10 itself may know what column 12 it is running and can make intelligent decisions on operating parameters. Of course, the option is always there for the trained user to override the suggested input parameters. GC technology, although extremely powerful, has been limited in use due to the need for a highly trained operator to continually tweak methods in order to get the system to operate correctly. Building this knowledge into the system may allow for a much broader audience to use this technique and may make the technique much more repeatable.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A gas chromatograph device comprising:
    a column configured for gas chromatography including column parameters associated with the column;
    a removable column holder housing the column and configured to be removable from the gas chromatograph device with the column;
        wherein, said column in the removable column holder including:
            an injector port pin connected to a first tip of the column at one end, the injector port pin is configured to provide a first air tight seal to an injector port of the gas chromatograph device;
            a detector pin connected to a second tip of the column at its other end, the detector pin is configured to provide a second air tight seal to a detector of the gas chromatograph device; and
        wherein, the removable column holder including a housing configured to contain the column in the removable column holder, where the housing containing the column inside with the injector port pin and the detector pin protruding therefrom; and
    a column recognition technology system configured to auto-recognize the column in the gas chromatograph device via the removable column holder, where the column recognition technology system includes a wireless communication between the gas chromatograph device and the removable column holder;
    wherein, the column recognition technology system is configured to auto-recognize the column parameters associated with the auto-recognized column.

2. The gas chromatograph device according to claim 1, wherein:
    the column recognition technology system is configured for allowing programming of the gas chromatograph device by automatically inputting the column parameters associated with the auto-recognized column into software of the gas chromatograph device so that the user has much less to program when running the gas chromatograph device;
    the column recognition technology system is configured to improve performance of the gas chromatograph device by suggesting other operating parameters based on the auto-recognized column;
    the column recognition technology system is configured to increase lifetime of the auto-recognized column;
    the column recognition technology system is configured to decrease issues with the gas chromatograph device by warning the user against operating parameters that are not compatible with certain column types;

the column recognition technology system is configured to warn the user against using high column temperatures for temperature sensitive columns; and the column recognition technology system is configured to write a number of runs associated with the auto-recognized column, wherein, the column recognition technology system is configured to enable a user to see how close the auto-recognized column is to the end of its lifetime based on the number of runs written to the auto-recognized column.

3. The gas chromatograph device according to claim 1, wherein the column recognition technology system including a two-way communication between the gas chromatograph device and the removable column holder with the auto-recognized column.

4. The gas chromatograph device according to claim 3, wherein the two-way communication between the gas chromatograph device and the removable column holder with the auto-recognized column is configured for reading stored information from the removable column holder with the auto-recognized column as well as writing new information to the removable column holder with the auto-recognized column.

5. The gas chromatograph device of claim 1, wherein the wireless communication including an RFID tag positioned on the column or the removable column holder, and an RFID reader/writer positioned inside or on the gas chromatograph device.

6. The gas chromatograph device of claim 5, wherein the RFID tag is configured to allow the column recognition technology system to pull the column parameters associated with the column from the auto-recognized column.

7. The gas chromatograph device of claim 6, wherein the column parameters pulled from the RFID tag by the column recognition technology system including:
a column inner diameter;
a film thickness;
a column length;
a number of runs;
maximum allowable operating parameters; or
combinations thereof.

8. The gas chromatograph device of claim 7, wherein the stored information pulled from the RFID tag by the column recognition technology system being configured to calculate variables of the gas chromatograph device including:
linear velocity; and
inlet carrier gas pressure.

9. The gas chromatograph device of claim 8, wherein the stored information pulled from the RFID tag by the column recognition technology system being configured to limit other input parameters including maximum temperatures, configured to improve performance and limit damage to the auto-recognized column.

10. The gas chromatograph device according to claim 1 further comprising:
a frame;
a cover;
gas fittings in fluid communication with an injector port;
a detector; and
at least one vent hole in the cover configured for providing air flow through the column via at least one fan.

11. A column recognition technology system for a column of a gas chromatograph device comprising:

the gas chromatograph device comprising a column configured for gas chromatography, the column including column parameters associated with the column; and a removable column holder housing the column and configured to be removable from the gas chromatograph device with the column;

wherein, said column in the removable column holder including:

an injector port pin connected to a first tip of the column at one end, the injector port pin is configured to provide a first air tight seal to an injector port of the gas chromatograph device;

a detector pin connected to a second tip of the column at its other end, the detector pin is configured to provide a second air tight seal to a detector of the gas chromatograph device; and wherein, the removable column holder including a housing configured to contain the column in the removable column holder, where the housing containing the column inside with the injector port pin and the detector pin protruding therefrom; and the column recognition technology system is configured to auto-recognize the column in the gas chromatograph device via the removable column holder; and a two-way communication between the gas chromatograph device and the removable column holder with the auto-recognized column;

wherein, the column recognition technology system is configured to auto-recognize the column parameters associated with the auto-recognized column inside of the removable column holder.

12. The column recognition technology system according to claim 11, wherein the two-way communication between the gas chromatograph device and the auto-recognized column is configured for reading stored information from the column as well as writing new information to the column.

13. The column recognition technology system of claim 11, wherein the wireless communication including an RFID tag positioned on the column or the removable column holder, and an RFID reader/writer positioned inside or on the gas chromatograph device, wherein the RFID tag is configured to allow the column recognition technology system to pull the column parameters associated with the column from the auto-recognized column.

14. The column recognition technology system of claim 13, wherein the column parameters pulled from the RFID tag by the column recognition technology system including:
a column inner diameter;
a film thickness;
a column length;
a number of runs;
maximum allowable operating parameters; or
combinations thereof;
wherein the stored information pulled from the RFID tag by the column recognition technology system being configured to calculate variables of the gas chromatograph device including:
linear velocity; and
inlet carrier gas pressure.

15. The column recognition technology system of claim 14, wherein the stored information pulled from the RFID tag by the column recognition technology system being configured to limit other input parameters including maximum temperatures, configured to improve performance and limit damage to the column.

16. The column recognition technology system according to claim 11, wherein the column recognition technology system is configured for:
  allowing programming of the gas chromatograph device by automatically inputting the column parameters associated with the auto-recognized column into software of the gas chromatograph device so that the user has much less to program when running the gas chromatograph device;
  improving performance of the gas chromatograph device by suggesting other operating parameters based on the auto recognized column;
  increasing the lifetime of the auto-recognized column;
  decreasing issues with the gas chromatograph device by warning the user against operating parameters that are not compatible with certain column types;
  warning the user against using high column temperatures for temperature sensitive columns;
  writing a number of runs associated with the auto-recognized column, wherein, the column recognition technology system is configured to enable users to see how close the auto-recognized column is to the end of its lifetime based on the number of runs written to the auto-recognized column; and
  combinations thereof.

17. A method of recognizing a column installed in a gas chromatograph device comprising:
  providing a column recognition technology system for the column of the gas chromatograph device comprising:
  the gas chromatograph device comprising:
    the column configured for gas chromatography, the column including column parameters associated with the column; and
    a removable column holder housing the column and configured to be removable from the gas chromatograph device with the column;
    wherein, said column in the removable column holder including:
      an injector port pin connected to a first tip of the column at one end, the injector port pin is configured to provide a first air tight seal to an injector port of the gas chromatograph device;
      a detector pin connected to a second tip of the column at its other end, the detector pin is configured to provide a second air tight seal to a detector of the gas chromatograph device; and
    wherein, the removable column holder including a housing configured to contain the column in the removable column holder, where the housing containing the column inside with the injector port pin and the detector pin protruding therefrom; and
  a column recognition technology system configured to auto-recognize the column in the gas chromatograph device via the removable column holder, where the column recognition technology system includes a wireless communication between the gas chromatograph device and the removable column holder;
  the column recognition technology system configured to auto-recognize the column in the gas chromatograph device;
  a two-way communication between the gas chromatograph device and the column;
  inserting the removable column holder with the column into the gas chromatograph device, where the injector port pin and the detector pin sealing to the injector port and the detector, respectively, at the same time;
  auto-recognizing the column inside of the removable column holder; and
  auto-recognizing the column parameters associated with the auto-recognized column inside of the removable column holder.

18. The method of recognizing the column installed in the gas chromatograph device of claim 17 further including:
  reading the column parameters from the auto-recognized column including column inner diameter, film thickness, column length, number of runs, and maximum allowable operating parameters;
  writing new information to the column including the number of runs; and
  calculating variables of the gas chromatograph device including linear velocity and inlet carrier gas pressure.

* * * * *